United States Patent
Shouji et al.

(10) Patent No.: US 12,170,494 B2
(45) Date of Patent: Dec. 17, 2024

(54) ELECTRIC MOTOR CONTROL METHOD AND ELECTRIC MOTOR CONTROL DEVICE

(71) Applicant: NISSAN MOTOR CO., LTD., Yokohama (JP)

(72) Inventors: Mitsuhiro Shouji, Kanagawa (JP); Tetsuro Kojima, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/710,867

(22) PCT Filed: Nov. 19, 2021

(86) PCT No.: PCT/JP2021/042656
§ 371 (c)(1),
(2) Date: May 16, 2024

(87) PCT Pub. No.: WO2023/089787
PCT Pub. Date: May 25, 2023

(65) Prior Publication Data
US 2024/0339945 A1 Oct. 10, 2024

(51) Int. Cl.
*H02P 21/00* (2016.01)
*H02P 21/05* (2006.01)
*H02P 21/18* (2016.01)
*H02P 27/12* (2006.01)

(52) U.S. Cl.
CPC ............. *H02P 21/05* (2013.01); *H02P 21/18* (2016.02); *H02P 27/12* (2013.01)

(58) Field of Classification Search
CPC ........... H02P 21/05; H02P 21/18; H02P 27/12
USPC ...................................... 318/400.02
See application file for complete search history.

(56) References Cited

U.S. PATENT DOCUMENTS

| | | | |
|---|---|---|---|
| 2002/0190683 A1 | 12/2002 | Karikomi et al. | |
| 2013/0141028 A1 | 6/2013 | Fujiwara et al. | |
| 2014/0152205 A1* | 6/2014 | Nakai | H02P 21/22 318/400.02 |

(Continued)

FOREIGN PATENT DOCUMENTS

| | | |
|---|---|---|
| JP | 2003-009566 A | 1/2003 |
| JP | 2005-269834 A | 9/2005 |

(Continued)

*Primary Examiner* — Erick D Glass
(74) *Attorney, Agent, or Firm* — Foley & Lardner LLP

(57) ABSTRACT

Provided is an electric motor control method includes: calculating a second torque command value by correcting the first torque command value by a vibration compensation torque for suppressing vibration in an electric motor rotation speed; limiting the vibration compensation torque based on a limit request suggesting amount suggesting a situation in which suppression of vibration in the electric motor rotation speed is to be limited; determining a limit level representing a degree of limit on the vibration compensation torque; and calculating a voltage command value by feeding back a torque suggesting amount suggesting an electric motor torque to the second torque command value. In the torque control step, a feedback gain of the torque suggesting amount is determined with reference to the limit level.

11 Claims, 12 Drawing Sheets

(56) References Cited

U.S. PATENT DOCUMENTS

2019/0337398 A1\* 11/2019 Fujiwara .................... B60L 7/08
2020/0259431 A1\* 8/2020 Sawada ..................... H02P 5/46

FOREIGN PATENT DOCUMENTS

JP        2012-075257 A     4/2012
JP        2019-170054 A    10/2019

\* cited by examiner

ELECTRIC MOTOR CONTROL METHOD AND ELECTRIC MOTOR CONTROL DEVICE

TECHNICAL FIELD

The present invention relates to an electric motor control method and an electric motor control device.

BACKGROUND ART

JP2012-75257A proposes an electric motor control method for performing vibration damping control to suppress vibration caused by torsional vibration characteristics of a driving transmission system in a vehicle. Furthermore, in this electric motor control method, from the viewpoint of suppressing abnormal noise generated in gears of a reduction gear due to repeated positive and negative reversal of a torque command, control is performed to limit a vibration damping function related to the vibration damping control in a specific electric motor operating region where the abnormal noise may occur.

SUMMARY OF INVENTION

As with the occurrence of abnormal noise in gears mentioned above, situations may arise in which the vibration damping function that suppresses torsional vibration of the driving transmission system should be limited depending on an operating state of the electric vehicle, the electric motor, or a control system of the electric motor. However, when the vibration damping function is limited in such situations, torsional vibration of the driving transmission system cannot be sufficiently suppressed, which may cause discomfort to occupants.

Therefore, an object of the present invention is to provide an electric motor control method and an electric motor control device that can suppress torsional vibration of a driving transmission system even when a vibration damping function that suppresses the torsional vibration is limited.

According to an aspect of the present invention, provided is an electric motor control method for controlling an electric motor based on a first torque command value corresponding to a required output of the electric motor. The electric motor control method includes: a vibration damping step of calculating a second torque command value by correcting the first torque command value by a vibration compensation torque, the vibration compensation torque being a torque correction value for suppressing vibration in an electric motor rotation speed; a limiting step of limiting the vibration compensation torque based on a limit request suggesting amount, the limit request suggesting amount being a parameter suggesting a situation in which suppression of vibration in the electric motor rotation speed is to be limited; a limit level determination step of determining a limit level representing a degree of limit on the vibration compensation torque; and a torque control step of calculating a voltage command value by feeding back a torque suggesting amount suggesting an electric motor torque to the second torque command value, the voltage command value being a command value of a voltage supplied from a predetermined power source to the electric motor. In the torque control step, a feedback gain of the torque suggesting amount is determined with reference to the limit level.

DESCRIPTION OF EMBODIMENTS

Embodiments of the present invention will be described below with reference to the drawings.

First Embodiment

Figure 1:
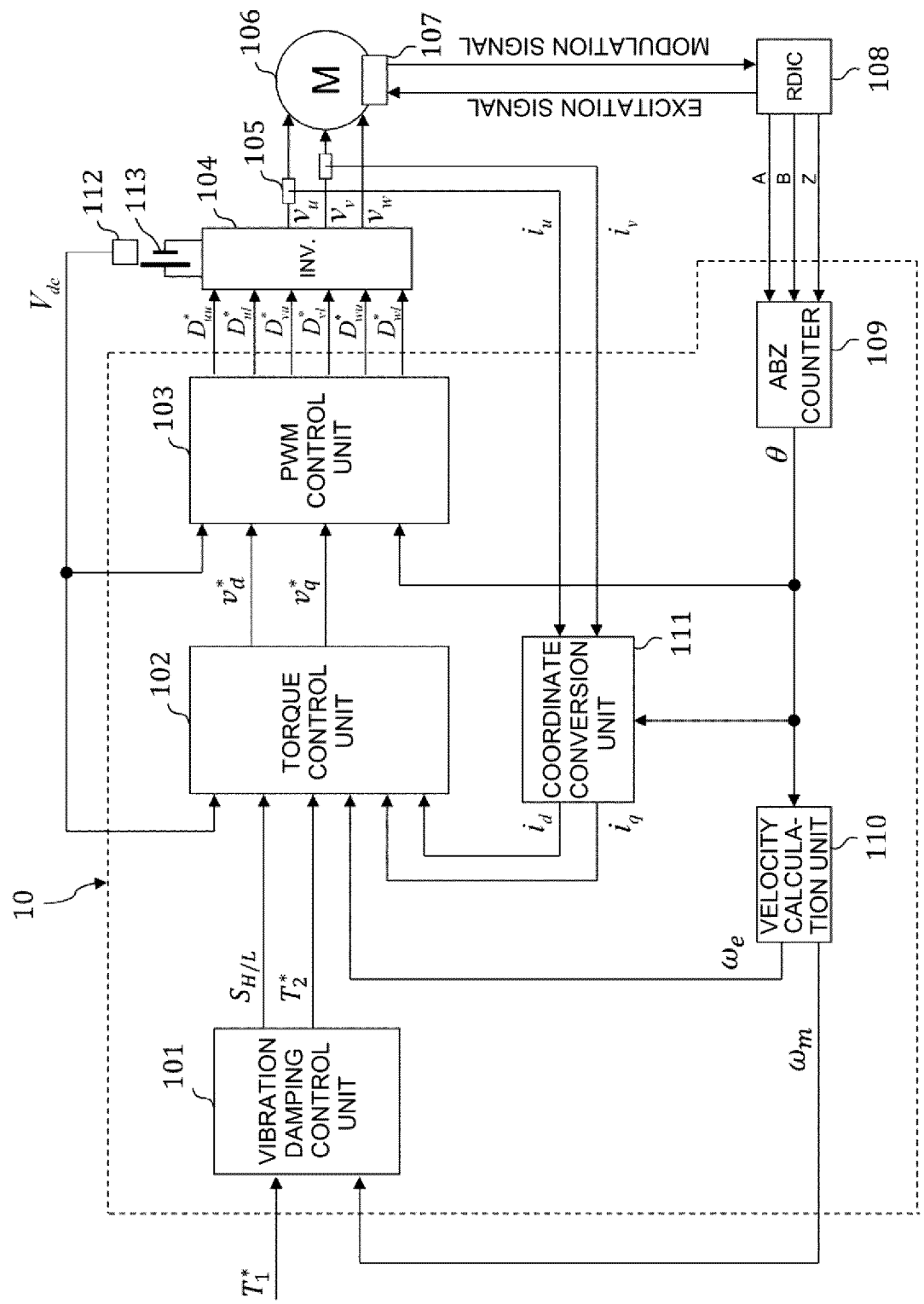
FIG. 1 is a block diagram illustrating a configuration of an electric motor control device that executes an electric motor control method according to each embodiment of the present invention.

FIG. 1 is a block diagram illustrating an electric motor control device 10 that executes an electric motor control method. As illustrated in FIG. 1, the electric motor control device 10 drives a motor 106 using electric power supplied from a battery 113 and controls an operating state thereof. Especially, the electric motor control device 10 is mounted, for example, on a vehicle such as an electric vehicle or a hybrid vehicle which uses the motor 106 as a traveling driving source.

The battery 113 is a secondary battery such as a lithium ion battery which functions as an electric power supply source for the motor 106 and other parts of the vehicle. In the present embodiment, the battery 113 is a DC power source. In the present embodiment, a voltage output by the battery 113 (hereinafter referred to as "DC voltage $V_{dc}$") is detected by a voltage sensor 112.

The motor 106 is implemented by, for example, an interior permanent magnet (IPM) type three-phase synchronous electric motor. Especially, the motor 106 (more specifically, a rotor of the motor 106) is connected to drive wheels via a driving power transmission system of the vehicle such as an output shaft, gears, and a drive shaft (not shown).

The electric motor control device 10 mainly includes a vibration damping control unit 101, a torque control unit 102, a pulse width modulation (PWM) control unit 103, a velocity calculation unit 110, and a coordinate conversion unit 111.

The vibration damping control unit 101 acquires a second torque command value T*$_2$ by executing vibration damping control calculation for suppressing vibration caused by the driving power transmission system (vibration in a motor rotation speed) based on a first torque command value T*$_1$ and a mechanical angular velocity ω$_m$ of the motor 106. Note that the first torque command value T*$_1$ is a basic torque command value determined from a required output for the motor 106. The required output for the motor 106 is determined according to an operation by a driver on the vehicle (operation on an accelerator pedal) or a required driving force based on a command from a higher-level controller (not shown) such as a predetermined automatic driving control device.

Further, the vibration damping control unit 101 generates a limit level signal S$_{H/L}$ as a flag indicating a determination result as to whether limit of a certain level or more is applied to the vibration damping control calculation. Then, the vibration damping control unit 101 outputs the second torque command value T*$_2$ and the limit level signal S$_{H/L}$ to the torque control unit 102. Note that details of processing in the vibration damping control unit 101 will be described later.

The torque control unit 102 receives the DC voltage V$_{dc}$, the limit level signal S$_{H/L}$, the second torque command value T*$_2$, an electric angular velocity ω$_e$ of the motor 106, a d-axis current i$_d$, and a q-axis current i$_q$, and then calculates command values of the voltage to be supplied to the motor 106 (d-axis voltage command value v*$_d$ and q-axis voltage command value v$_q$). Then, the torque control unit 102 outputs the calculated d-axis voltage command value v*$_d$ and q-axis voltage command value v*$_q$ to the PWM control unit 103. Note that details of processing in the torque control unit 102 will be described later.

In the following, to simplify the description, a component of each parameter expressed in a dq-axis coordinate system will be represented by a symbol "x" (x=d or q) as appropriate. For example, the d-axis current i$_d$ and the q-axis current i$_q$ are collectively described as a "dq-axis current i$_x$" or the like.

The PWM control unit 103 receives the DC voltage V$_{dc}$, a voltage command value v*$_x$, and an electric angle θ of the motor 106, and then generates driving signals D*$_{uu}$ to D*$_{w1}$ for driving switching elements of an inverter 104. Then, the PWM control unit 103 outputs the generated driving signals D*$_{uu}$ to D*$_{w1}$ to the inverter 104. Note that details of processing in the PWM control unit 103 will be described later.

The inverter 104 includes a plurality of semiconductor switching elements and a driving circuit (not shown) that drives these switching elements. Especially, the inverter 104 drives each switching element according to the driving signals D*$_{uu}$ to D*$_{w1}$. As a result, the DC voltage V$_{dc}$ is converted to a three-phase (v$_u$, v$_v$, v$_w$) AC voltage and then supplied to the motor 106. That is, the motor 106 is driven to output an actual torque according to a desired torque command value T*.

A current sensor 105 is implemented by a plurality of individual sensors for detecting each phase component of a three-phase (i$_u$, i$_v$, i$_w$) alternating current output by the inverter 104. FIG. 1 shows an example in which the current sensor 105 is implemented by two individual sensors that respectively detect a u-phase current i$_u$ and a v-phase current i$_v$. In this case, the remaining w-phase current i$_w$ can be determined from the u-phase current i$_u$ and the v-phase current i$_v$ using the fact that a sum of the three phase components is 0. Note that the current sensor 105 may be implemented by individual sensors provided for all three phases. Then, the current sensor 105 outputs the detected current value of each phase to the coordinate conversion unit 111.

A resolver 107 functions as a rotor position detector that detects a rotor position of the motor 106. Especially, the resolver 107 transmits and receives excitation signals and modulation signals to and from a resolver-to-digital conversion circuit (RDIC) 108.

The RDIC 108 generates an ABZ signal (digital angle information of the motor 106) including up-down counter pulses A, B and an origin signal pulse Z based on the excitation signals and modulation signals. The RDIC 108 outputs the generated ABZ signal to an ABZ counter 109.

The ABZ counter 109 calculates the electric angle θ based on the ABZ signal. Then, the ABZ counter 109 outputs the calculated electric angle to the PWM control unit 103, the velocity calculation unit 110, and the coordinate conversion unit 111.

The velocity calculation unit 110 calculates the electric angular velocity ω$_e$ and the mechanical angular velocity ω$_m$ of the motor 106 from an amount of change per hour in the electric angle θ. Then, the velocity calculation unit 110 outputs the calculated electric angular velocity ω$_e$ to the torque control unit 102 and the mechanical angular velocity ω$_m$ to the vibration damping control unit 101.

The coordinate conversion unit 111 converts the three-phase alternating current (i$_u$, i$_v$, i$_w$) detected by the current sensor 105 to the dq-axis current i$_x$ based on the following Equation (1) using the electric angle θ.

[Math. 1]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (1)$$

That is, by Equation (1), the dq-axis current i$_x$ is determined corresponding to a detected current value in the dq-axis coordinate system. Then, the coordinate conversion unit 111 outputs the acquired dq-axis current i$_x$ to the torque control unit 102.

Note that the electric motor control device 10 is implemented by a computer including a central processing unit (CPU), a read-only memory (ROM), a random access memory (RAM), and an input/output interface (an I/O interface), and programmed to be able to execute each of the configurations described above. The electric motor control device 10 can also be implemented by a plurality of pieces of computer hardware that execute the respective processing in a distributed manner.

Next, I. details of processing in the vibration damping control unit 101, II. details of processing in the torque control unit 102, and III. details of processing in the PWM control unit 103 will be described.

[I. Vibration Damping Control Unit 101]

Figure 2:
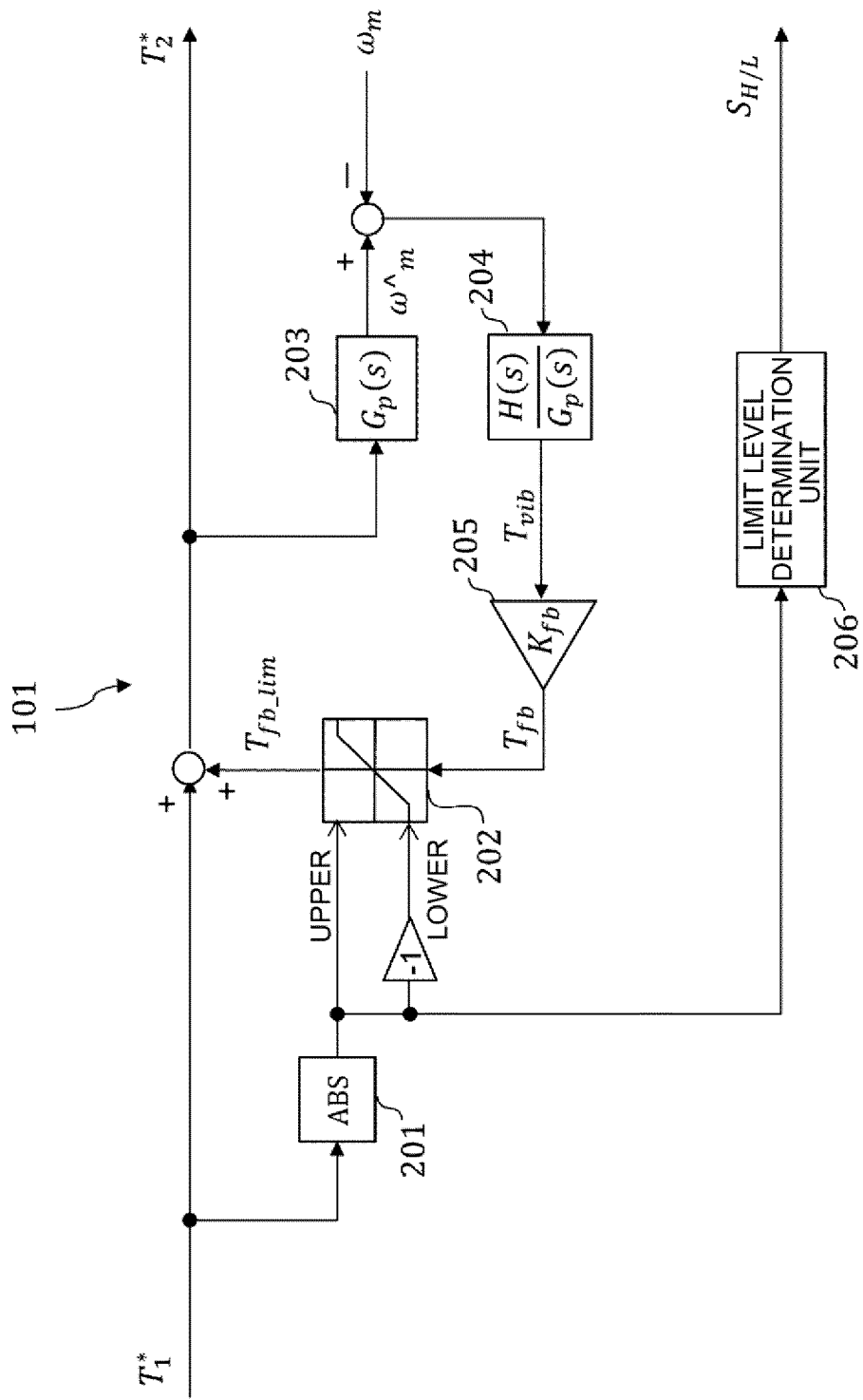
FIG. 2 is a block diagram illustrating a configuration of a vibration damping control unit.

FIG. 2 is a block diagram illustrating a configuration of the vibration damping control unit 101. As illustrated, the vibration damping control unit 101 includes an absolute value processing unit 201, a limiter 202, a mechanical angular velocity estimating unit 203, a vibration torque estimating unit 204, and a gain unit 205.

Especially, the mechanical angular velocity estimating unit 203, the vibration torque estimating unit 204, and the gain unit 205 mainly function as configurations for acquiring a vibration compensation torque $T_{fb}$. Note that the vibration compensation torque $T_{fb}$ is a torque correction value for the first torque command value $T^*_1$. Especially, the vibration compensation torque $T_{fb}$ is determined from the first torque command value $T^*_1$ corresponding to the required output for the motor 106 so as to remove vibration in the motor rotation speed caused by torsional vibration in the driving power transmission system.

More specifically, the mechanical angular velocity estimating unit 203 acquires an estimated mechanical angular velocity $\omega\wedge_m$ by applying a transfer characteristic $G_p(s)$ obtained from a vehicle transmission system model, which will be described later, to a feedback value of the second torque command value $T^*_2$. Then, the vibration torque estimating unit 204 receives a deviation between this estimated mechanical angular velocity $\omega\wedge_m$ and the mechanical angular velocity $\omega_m$ corresponding to a detected value mentioned above, and then applies a transfer function including the transfer characteristic $G_p(s)$ and a bandpass filter $H(s)$ to acquire a vibration torque $T_{vib}$. Further, the gain unit 205 applies a vibration damping gain $K_{fb}(0 \le K_{fb} \le 1)$ to the vibration torque $T_{vib}$ to acquire a vibration compensation torque $T_{fb}$, and outputs the acquired vibration compensation torque $t_{fb}$ to the limiter 202.

On the other hand, the absolute value processing unit 201 and the limiter 202 function as configurations for determining a limited vibration compensation torque $T_{fb\_lim}$. Note that the limited vibration compensation torque $T_{fb\_lim}$ is a value obtained by limiting the vibration compensation torque $T_{fb}$ under predetermined conditions determined in consideration of suppressing abnormal noise due to gear backlash.

More specifically, the absolute value processing unit 201 performs absolute value processing on the first torque command value $T^*_1$, and an upper limit value and a lower limit value of the absolute value are determined as an upper limit value and a lower limit value (hereinafter also collectively referred to as "upper and lower limit values") in the limiter 202, respectively. That is, in the present embodiment, the first torque command value $T^*_1$ functions as a limit request suggesting amount that suggests a situation in which suppression of torsional vibration in the driving power transmission system is to be limited (particularly a situation in which abnormal noise due to gear backlash may occur). Then, the limiter 202 acquires the limited vibration compensation torque $T_{fb\_lim}$ by performing limit processing on the vibration compensation torque $T_{fb}$ based on the upper and lower limit values defined by the absolute value processing unit 201. Here, when the first torque command value $T^*_1$ is 0, both the upper limit value and the lower limit value in the limiter 202 are defined as 0. Therefore, the limited vibration compensation torque $T_{fb\_lim}$ also becomes 0. Therefore, in this case, the generation of abnormal noise of gears and the decrease in control stability caused by the vibration compensation torque $T_{fb}$ being output as is without being limited are suppressed.

Further, the limit level determination unit 206 determines a limit level representing a degree of limit on the vibration compensation torque $T_{fb}$, and generates a limit level signal $S_{H/L}$ containing the determined limit level as information.

More specifically, the limit level determination unit 206 determines whether the limit level is relatively high or relatively low with reference to the absolute value of the first torque command value $T^*_1$, based on a comparison between the absolute value (that is, the upper and lower limit values in the limiter 202) and a predetermined reference value. Then, the limit level determination unit 206 generates a binary signal ("High" or "Low") corresponding to the relative degree of the limit level as the limit level signal $S_{H/L}$.

For example, a relation between the absolute value of the first torque command value $T^*_1$ and the limit level signal $S_{H/L}$ can be determined as shown in Table 1 below.

TABLE 1

| $|T_1^*|$ [Nm] | Limit level signal |
|---|---|
| <20 | High |
| ≥20 | Low |

According to the example in Table 1, when the absolute value of the first torque command value $T^*_1$ is less than 20 N, the limit level signal $S_{H/L}$ is set to High assuming that the limit level for the vibration compensation is relatively high. On the other hand, when the absolute value of the first torque command value $T^*_1$ is 20 N or more, the limit level signal $S_{H/L}$ is set to Low assuming that the limit level for the vibration compensation is relatively low.

Next, the transfer characteristic $G_p(s)$ will be described.

Figure 3:
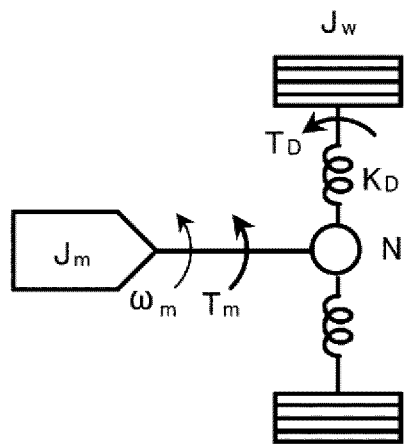
FIG. 3 is a diagram illustrating a dynamical system model that provides equations of motion of a torsional vibration system.
Figure 3:
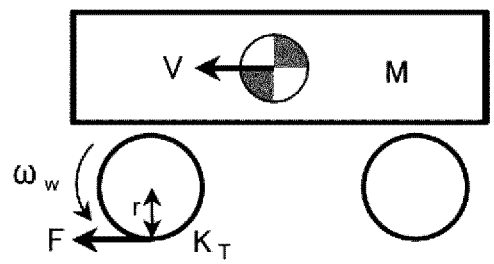

FIG. 3 is a diagram illustrating a dynamical system model that provides equations of motion of a torsional vibration system. Note that each parameter shown in FIG. 3 is as follows.

$J_m$: motor inertia
$J_w$: drive wheel inertia
M: vehicle weight
$K_D$: torsional rigidity of driving system
$K_T$: coefficient related to friction between tire and road surface
N: overall gear ratio
r: tire load radius
$\omega_m$: motor mechanical angular velocity
$T_m$: motor output shaft torque
$T_D$: drive wheel torque
F: force applied to vehicle
V: vehicle speed
$\omega_w$: angular velocity of drive wheel From FIG. 3, the equations of motion of the electric vehicle are expressed by the following Equations (2) to (6).

[Math. 2]

$$J_m \cdot \frac{d}{dt}\omega_m = T_m - \frac{T_D}{N} \quad (2)$$

$$2J_w \cdot \frac{d}{dt}\omega_m = T_D - rF \quad (3)$$

$$M \cdot \frac{d}{dt}v = F \quad (4)$$

$$T_D = K_D \cdot \int \left(\frac{\omega_m}{N} - \omega_w\right) dt \quad (5)$$

$$F = K_T \cdot (r \cdot \omega_n - v) \quad (6)$$

Based on the above equations of motion (2) to (6), the transfer characteristic $G_p(s)$ from the motor torque to the motor mechanical angular velocity is expressed as in the following Equations (7) to (15).

[Math. 3]

$$G_p(s) = \frac{b_3 s^3 + b_2 s^2 + b_1 s + b_0}{s(a_4 s^3 + a_3 s^2 + a_2 s + a_1)} \quad (7)$$

$$a_4 = 2 J_m J_w M \quad (8)$$

$$a_3 = J_m (2 J_w + M r^2) K_T \quad (9)$$

$$a_2 (J_m + 2 J_w / N^2) M K_D \quad (10)$$

$$a_1 = (J_m + 2 J_w / N^2 + M r^2 / N^2) K_D K_T \quad (11)$$

$$b_3 = 2 J_w M \quad (12)$$

$$b_2 = (2 J_w + M r^2) K_T \quad (13)$$

$$b_1 = M K_D \quad (14)$$

$$b_0 = K_D K_T \quad (15)$$

Note that "s" in Equation (7) represents a Laplace operator. Further, by transforming Equation (7), the following Equation (16) is obtained.

[Math. 4]

$$G_p(s) = \frac{(s + \beta)(b'_2 s^2 + b'_1 s + b'_0)}{s(s + \alpha)(a'_3 s^2 + a'_2 s + a'_1)} \quad (16)$$

Note that each coefficient $a'_1$ to $a'_3$ and $b'_0$ to $b'_2$ in Equation (16) is determined by each coefficient $a_1$ to $a_4$ and $b_0$ to $b_3$ defined in Equations (8) to (15).

Here, when poles and zeros of the transfer characteristic $G_p(s)$ are examined, extreme values are shown. That is, it means that $\alpha$ and $\beta$ in Equation (16) have values that are extremely close to each other. Therefore, by performing pole-zero cancellation (approximation processing of making $\alpha=\beta$) on Equation (16), the transfer characteristic $G_p(s)$ can be expressed as a rational function in which the numerator is quadratic and the denominator is cubic as shown in Equation (17) below.

[Math. 5]

$$G_p(s) = \frac{b'_2 s^2 + b'_1 s + b'_0}{s(a'_3 s^2 + a'_2 s + a'_1)} = \frac{1}{s} \cdot \frac{b_2 s^2 + b_1 s + b_0}{(s^2 + 2 \xi_p \omega_p s + \omega_p^2)} \quad (17)$$

Here, in Equation (17), "$\omega_p$" represents a torsional resonance angular frequency of the transfer characteristic $G_p(s)$, and "$\xi_p$" represents an attenuation coefficient of the transfer characteristic $G_p(s)$. Further, in consideration of convenience of computer processing, it is preferable to discretize (z-transform) Equation (17) using a variable z expressed by Equation (18) below. Note that "T" in Equation (18) represents a sampling time of control.

[Math. 6]

$$s = \frac{2}{T} \cdot \frac{1 - z^{-1}}{1 + z^{-1}} \quad (18)$$

Next, the bandpass filter H(s) will be described. The bandpass filter H(s) is configured to have a filter characteristic that functions as a feedback element that selectively reduces the torsional vibration of the driving system.

Figure 4:
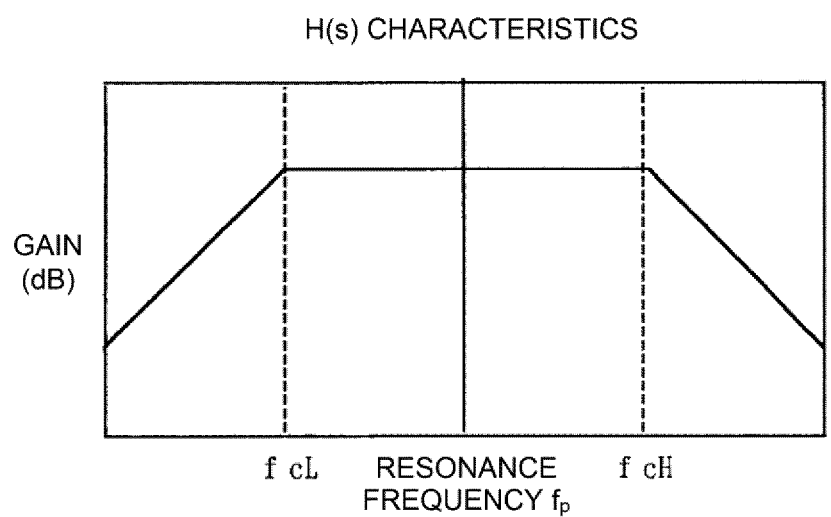
FIG. 4 is a graph showing filter characteristics of a bandpass filter $H(s)$.

FIG. 4 is a graph showing the filter characteristic of the bandpass filter H(s). In the filter characteristic shown in FIG. 4, attenuation characteristics of a low-pass side and a high-pass side match each other, and a torsional resonance frequency $f_p$ of the driving system is set to be at a center of a passband on a logarithmic axis (log scale). By providing the bandpass filter H(s) with such a filter characteristic, it is possible to enhance the effect of selectively reducing the torsional vibration of the driving system. More specifically, the bandpass filter H(s) can be configured by a combination of a primary low-pass filter and a high-pass filter shown in Equation (19) below.

[Math. 7]

$$H(s) = 2(1 - \xi_p) \frac{\omega_p}{s + \omega_p} \frac{s}{s + \omega_p} \quad (19)$$

[II. Torque Control Unit 102]

Figure 5:
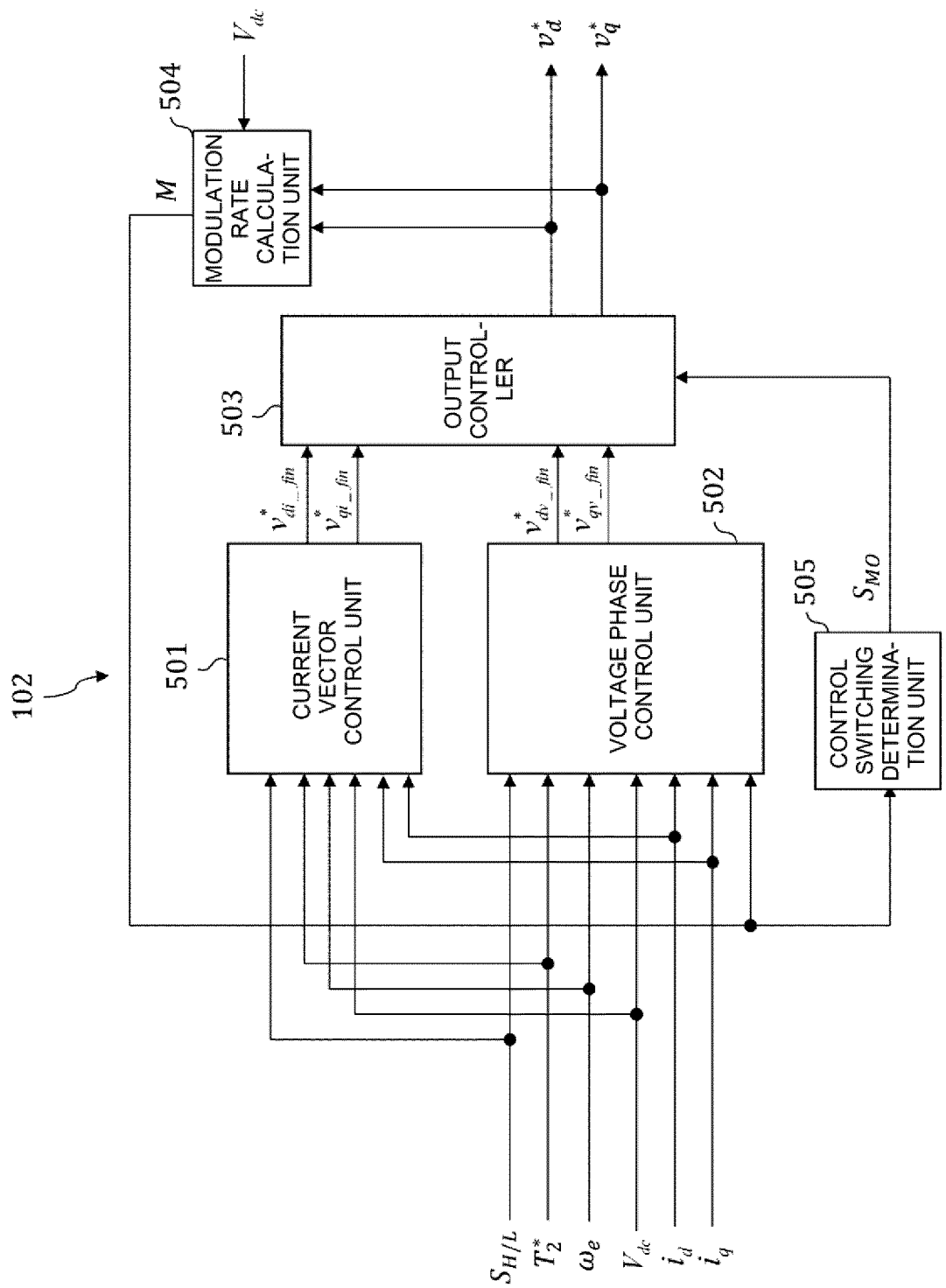
FIG. 5 is a block diagram illustrating a configuration of a torque control unit.

FIG. 5 is a block diagram illustrating a configuration of the torque control unit 102. The torque control unit 102 includes a current vector control unit 501, a voltage phase control unit 502, an output controller 503, a modulation rate calculation unit 504, and a control switching determination unit 505.

The current vector control unit 501 receives the limit level signal $S_{H/L}$, the second torque command value $T^*_2$, the electric angular velocity $\omega_e$, the DC voltage $V_{dc}$, and the dq-axis current $i_x$, and then calculates a d-axis voltage command value $v^*_{di\text{-}fin}$ and a q-axis voltage command value $v^*_{qi\text{-}fin}$ by current vector control.

The voltage phase control unit 502 receives the limit level signal $S_{H/L}$, the second torque command value $T^*_2$, the electric angular velocity $\omega_e$, the DC voltage $V_{dc}$, the dq-axis current $i_x$, and the modulation rate M, and then calculates a d-axis voltage command value $v^*_{dv\text{-}fin}$ and a q-axis voltage command value $v^*_{qv\text{-}fin}$ by voltage phase control.

The output controller 503 receives a mode selection signal $S_{MO}$ generated by the control switching determination unit 505, and then outputs either a dq-axis voltage command value $V_{xi\text{-}fin}$ based on the current vector control or a dq-axis voltage command value $v_{xv\text{-}*fin}$ based on the voltage phase control, as a final dq-axis voltage command value $v^*_x$.

The modulation rate calculation unit 504 receives the DC voltage $V_{dc}$ and the dq-axis voltage command value $v^*_x$, and then calculates the modulation rate M based on the following Equation (20), and outputs the modulation rate M to the voltage phase control unit 502 and the control switching determination unit 505.

[Math. 8]

$$M = \sqrt{2} \cdot \frac{\sqrt{v_d^{*2} + v_q^{*2}}}{V_{dc}} \quad (20)$$

Based on the modulation rate M, the control switching determination unit 505 generates the mode selection signal $S_{MO}$ that defines a control mode (current vector control or voltage phase control) and a modulation mode to be executed. For example, the control switching determination unit 505 generates the mode selection signal $S_{MO}$ using a logic shown in Table 2 below.

TABLE 2

| Modulation rate M | Control mode | Modulation mode |
|---|---|---|
| M > 1.05 | Voltage phase control | Synchronous PWM modulation |
| 1.05 ≥ M > 1.00 | Current vector control | |
| 1.00 ≥ M | | Asynchronous PWM modulation |

Further details of the current vector control unit 501 and the voltage phase control unit 502 will be described below.

II-1. Current Vector Control Unit 501

Figure 6:
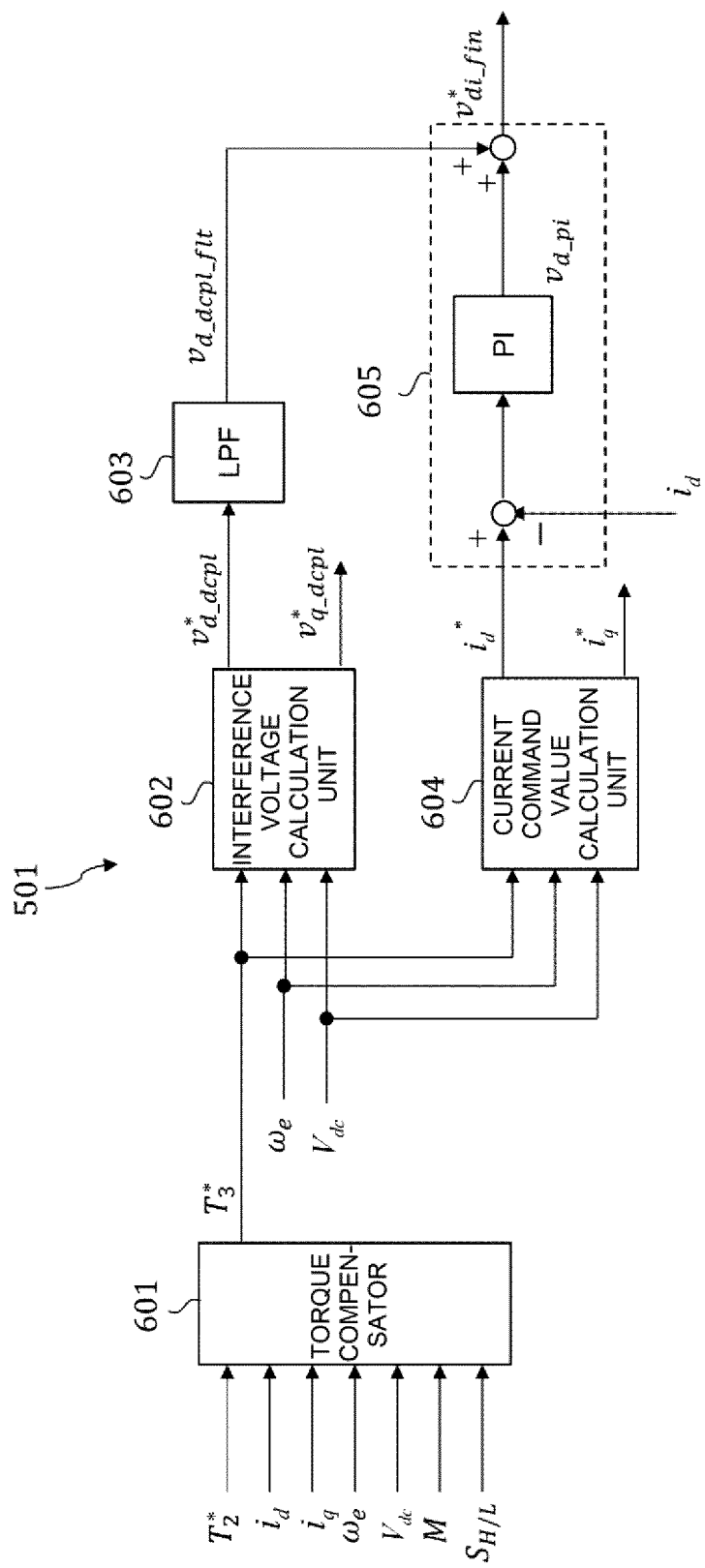
FIG. 6 is a block diagram illustrating a configuration of a current vector control unit.

FIG. 6 is a block diagram illustrating a configuration of the current vector control unit 501. Note that in FIG. 6, to simplify the drawing, a part of a configuration related to calculation of the q-axis voltage command value $v^*_{qi\text{-}fin}$ will be omitted. However, the omitted part is similar to a configuration related to calculation of the d-axis voltage command value $v^*_{di\text{-}fin}$.

As illustrated, the current vector control unit 501 includes a torque compensator 601, an interference voltage calculation unit 602, a filter unit 603, a current command value calculation unit 604, and a voltage command value calculation unit 605.

The torque compensator 601 acquires a torque command value T* (hereinafter also referred to as "third torque command value $T^*_3$") by compensating the second torque command value $T^*_2$ by processing described later, and outputs the acquired torque command value T* to the interference voltage calculation unit 602 and the current command value calculation unit 604.

The interference voltage calculation unit 602 receives the third torque command value $T^*_3$, the electric angular velocity $\omega_e$, and the DC voltage $V_{dc}$, and then refers to a look-up interference voltage table prepared in advance to acquire a d-axis interference voltage $v^*_{d\text{-}dcpl}$ and a q-axis interference voltage $v^*_{q\text{-}dcpl}$. Note that values stored in the look-up interference voltage table are determined in advance through experiment or analysis and are stored in a predetermined storage area.

The filter unit 603 applies a low-pass filter determined by the following Equation (21) to a dq-axis interference voltage $v^*_{x\text{-}dcpl}$ acquired by the interference voltage calculation unit 602, so as to acquire a dq-axis non-interference voltage $V_{x\text{-}dcpl\text{-}fit}$. Note that "τ" in the following Equation (21) represents a model response time constant of the dq-axis current $i_x$.

[Math. 9]

$$v_{x\_dcpl\_fit} = \frac{1}{\tau s + 1} v^*_{x\_dcpl} \quad (21)$$

The current command value calculation unit 604 receives the third torque command value $T^*_3$, the electric angular velocity $\omega_e$, and the DC voltage $V_{dc}$, and then refers to a look-up current table prepared in advance to acquire a d-axis current command value $i_d^*$ and a q-axis current command value $i_q^*$. Note that values stored in the look-up current table are determined in advance through experiment or analysis and are stored in a predetermined storage area.

The voltage command value calculation unit 605 receives a dq-axis current command value $i_x^*$, the dq-axis non-interference voltage $V_{x\text{-}dcpl\text{-}fit}$, and the dq-axis current $i_x$ equivalent to a detected value, and then acquires a dq-axis voltage command value $v^*_{xi\text{-}fin}$ for current vector control based on the following Equations (22) and (23).

[Math. 10]

$$v_{xi\_pi} = \left(k_{px} + \frac{k_{ix}}{s}\right)(i_x^* - i_x) \quad (22)$$

$$v^*_{xi\_fin} = v_{xi\_pi} + v_{x\_dcpl\_fit} \quad (23)$$

Note that in the equations, "$k_{px}$" means a proportional gain, and "$k_{ix}$" means an integral gain. In Equation (22), "$V_{xi\text{-}pi}$" determined is a basic dq-axis control voltage when no interference voltage component is considered. Further, the proportional gain $k_{px}$ and the integral gain $k_{ix}$ are determined, for example, by the following Equation (24).

[Math. 11]

$$k_{px} = \frac{L_x}{\tau} \quad k_{ix} = \frac{R}{\tau} \quad (24)$$

Note that in the equation, "Lx" represents a self-inductance of each axis component, and "R" represents a winding resistance, and "t" represents a model response time constant of the dq-axis current $i_x$, which is the same as in Equation (21).

Next, details of the torque compensator 601 will be described.

II-2. Torque Compensator 601

Figure 7:
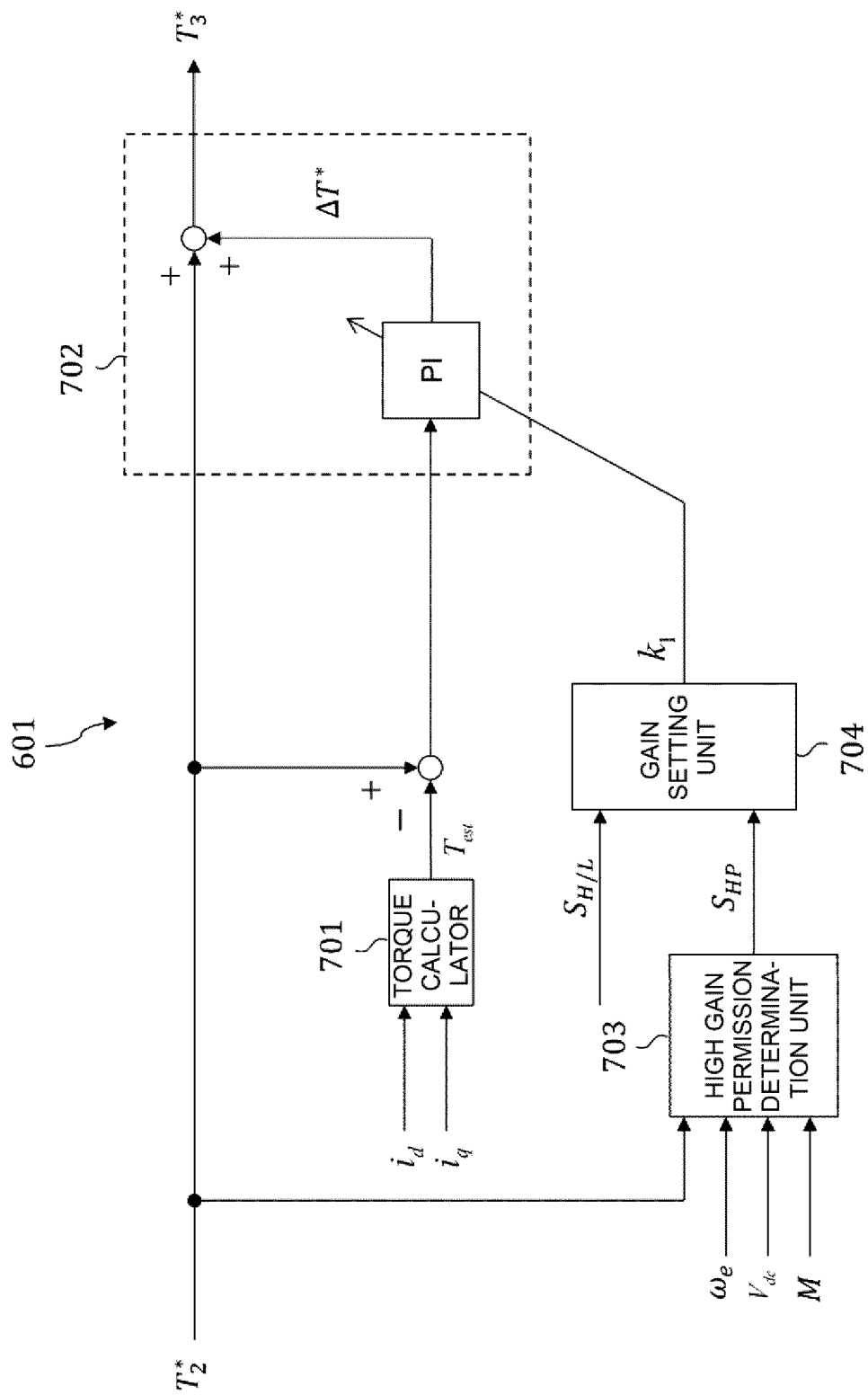
FIG. 7 is a block diagram illustrating a configuration of a torque compensator.

FIG. 7 is a block diagram illustrating a configuration of the torque compensator 601. As illustrated, the torque compensator 601 includes a torque calculator 701, a torque compensation value calculation unit 702, a high gain permission determination unit 703, and a gain setting unit 704.

The torque calculator 701 receives the dq-axis current $i_x$, and then refers to a look-torque-up table prepared in advance to acquire an estimated torque value $T_{est}$. Note that values stored in the look-up torque table are determined in advance through experiment or analysis and are stored in a predetermined storage area.

The torque compensation value calculation unit 702 receives the second torque command value $T^*_2$, the estimated torque value $T_{est}$, and a gain $k_1$ described later, and then calculates a torque compensation value ΔT* based on the following Equation (25).

[Math. 12]

$$\Delta T^* = \left(1 + k_1 \frac{1}{s}\right)(T_2^* - T_{est}) \quad (25)$$

Meanwhile, the high gain permission determination unit 703 determines whether to permit setting of a relatively high gain $k_1$ (hereinafter also referred to as a "high gain") based on the second torque command value $T^*_2$, the electric angular velocity $\omega_e$, the DC voltage $V_{dc}$, and the modulation rate M. Then, the high gain permission determination unit 703 generates a high gain permission signal $S_{HP}$ as a binary signal indicating a determination result of permission or disapproval of the high gain setting. For example, the high gain permission determination unit 703 uses a logic shown in Table 3 below to generate the high gain permission signal $S_{HP}$.

TABLE 3

| Modulation rate M [—] | DC voltage $V_{dc}$ [V] | Electric angular velocity $\omega_e$ [rad/s] | Torque $T_2^*$ [Nm] | High gain permission signal |
|---|---|---|---|---|
| >1.00 | Within system warranty | Within system warranty | $-30 < T_2^* < 30$ | Permission |
|  |  |  | Other than above | Disapproval |
|  |  | Other than above | — | — |
|  | Other than above | — | — | — |
| ≤1.00 | — | — | — | — |

Especially, in the example shown in Table 3, in an overmodulation region where PWM waveform changes tend to be steep (M>100) and a low torque region with relatively abundant gain margin and room for higher gain, the high gain setting is allowed. In the example shown in Table 3, when the DC voltage $V_{dc}$ or the electric angular velocity $\omega_e$ is outside the system warranty, system protection is given priority and high gain setting is not permitted.

Note that the logic for determining whether to permit the high gain setting is not limited to the form shown in Table 3. Especially, in each parameter shown in Table 3, threshold values for determining whether the high gain setting is permitted can be appropriately set to preferable values in consideration of a balance between control stability and system protection.

Next, the gain setting unit 704 determines a value of the gain $k_1$ used in Equation (25) above based on the limit level signal $S_{H/L}$ and the high gain permission signal $S_{HP}$. The gain setting unit 704 determines the gain $k_1$ using the logic shown in Table 4 below, for example.

TABLE 4

| Limit level signal | High gain permission signal | PI gain $k_1$ [s$^{-1}$] |
|---|---|---|
| High | Permission Disapproval | $0.005^{-1}$ |
| Low | Permission Disapproval | $0.02^{-1}$ |

Then, the torque compensator 601 outputs a value obtained by adding the torque compensation value $\Delta T^*$ to the second torque command value $T^*_2$ as the third torque command value $T_3^*$.

Next, a configuration of the voltage phase control unit 502 will be explained.

II-3. Voltage Phase Control Unit 502

Figure 8:
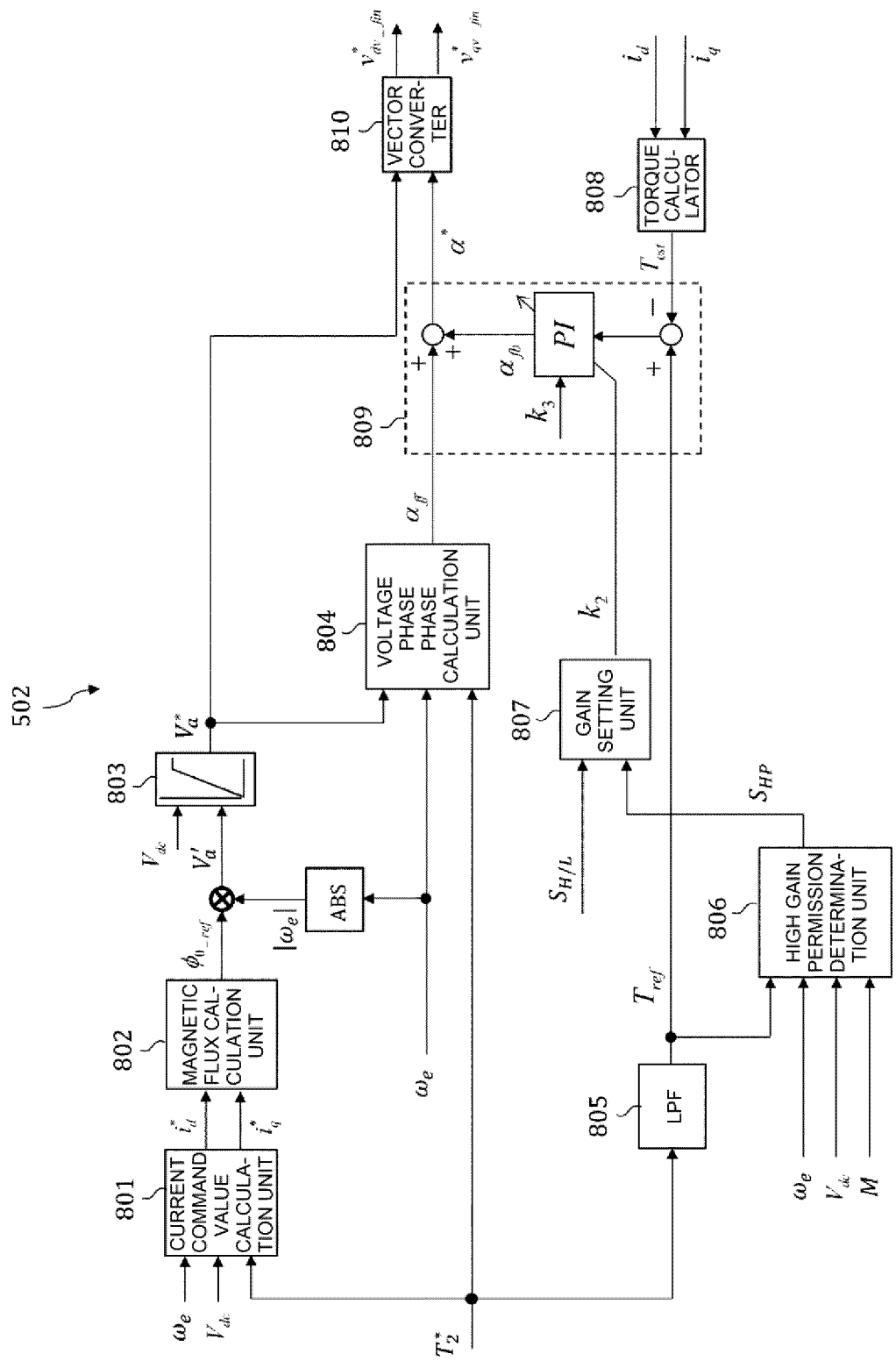
FIG. 8 is a block diagram illustrating a configuration of a voltage phase control unit.

FIG. 8 is a block diagram illustrating the configuration of the voltage phase control unit 502. As illustrated, the voltage phase control unit 502 includes a current command value calculation unit 801, a magnetic flux calculation unit 802, a limiter 803, a voltage phase calculation unit 804, a filtering unit 805, a high gain permission determination unit 806, a gain setting unit 807, a torque calculator 808, a voltage phase command value calculation unit 809, and a vector converter 810.

The current command value calculation unit 801 receives the second torque command value $T^*_2$, the electric angular velocity $\omega_e$, and the DC voltage $V_{dc}$, and then refers to the same look-up table that is used in the current command value calculation unit 604 to acquire the dq-axis current command value $i_x^*$.

The magnetic flux calculation unit 802 receives the dq-axis current command value $i_x^*$, and then refers to a look-up magnetic flux table prepared in advance to acquire a magnetic flux norm value $\varphi_{0\_ref}$. Note that values stored in the look-up magnetic flux table are determined in advance through experiment or analysis and are stored in a predetermined storage area. Then, a provisional voltage norm $V_a'$ obtained by multiplying the obtained magnetic flux norm value $\varphi_{0\_ref}$ by the absolute value of the electric angular velocity $\omega_e$ is output to the limiter 803.

The limiter 803 acquires a voltage norm command value $V_a^*$ from the provisional voltage norm $V_a'$ based on the following Equation (26).

[Math. 13]

$$V_a^* = \min\left(V_a', \frac{\sqrt{6}}{\pi} V_{dc}\right) \tag{26}$$

That is, the voltage norm command value $V_a^*$ is determined as a value obtained by limiting the provisional voltage norm $V_a'$ by a fundamental wave component value ($\sqrt{6}/\pi \cdot V_{dc}$) of a voltage norm $V_a$ corresponding to rectangular wave driving.

The voltage phase calculation unit 804 receives the voltage norm command value $V_a^*$, the electric angular velocity $\omega_e$, and the second torque command value $T^*_2$, and then refers to a look-up voltage phase table prepared in advance to acquire a voltage phase $\alpha_{ff}$. Note that the look-up voltage phase table is determined in advance through experiment or analysis and is stored in a predetermined storage area.

Meanwhile, the filtering unit 805 applies primary low-pass filtering having the above-described time constant $\tau$ to the second torque command value $T^*_2$ to acquire a torque reference value $T_{ref}$. That is, the torque reference value $T_{ref}$ is determined as a model torque response assumed by the second torque command value $T^*_2$.

The high gain permission determination unit 806 generates the high gain permission signal $S_{HP}$ indicating a determination of permission or disapproval of relatively increasing a gain $k_2$, which will be described later, based on the torque reference value $T_{ref}$, the DC voltage $V_{dc}$, and the modulation rate M. Note that the logic shown in Table 3 can be similarly applied to generate the high gain permission signal $S_{HP}$. In other words, the logic in Table 3 can be used by replacing the "second torque command value $T^*_2$" in Table 3 with the "torque reference value $T_{ref}$".

The gain setting unit 807 determines a value of the gain $k_2$, which will be described later, based on the limit level signal $S_{H/L}$ and the high gain permission signal $S_{HP}$. Note that the logic shown in Table 4 can be similarly applied to determine the gain $k_2$. That is, the logic in Table 4 can be used by replacing the "gain $k_1$" in Table 4 with the "gain $k_2$".

The torque calculator 808 receives the dq-axis current $i_x$, and refers to a look-up torque table similar to that used in the torque calculator 701 to acquire the estimated torque value $T_{est}$.

The voltage phase command value calculation unit 809 receives the voltage phase $\alpha_{ff}$, the estimated torque value $T_{est}$, and the gain $k_2$, and then calculates a voltage phase compensation value $\alpha_{fb}$ and a voltage phase command value $\alpha^*$ based on the following Equations (27) and (28).

[Math. 14]

$$\alpha_{fb} = k_2 k_3 \left(1 + \frac{T}{s}\right)(T_{ref} - T_{est}) \tag{27}$$

$$\alpha^* = \alpha_{ff} + \alpha_{fb} \tag{28}$$

Note that the gain $k_2$ in Equation (27) is determined so that a basic value (low gain) thereof matches a reciprocal of a designed value of a torque feedback response time constant in voltage phase control. A gain $k_3$ in Equation (27) is a constant that indicates sensitivity of the voltage phase $\alpha$ to the torque. Especially, the gain $k_3$ is determined as appropriate depending on characteristics of the motor 106.

The vector converter 810 receives the voltage norm command value $V_a^*$, the voltage phase command value at, and the voltage phase compensation value $\alpha_{fb}$, and then acquires the dq-axis voltage command value $V_{xv\text{-}fin}$ for current phase control based on the following Equation (29).

[Math. 15]

$$\begin{cases} v^*_{dv\_fin} = -V^*_a \sin\alpha^* \\ v^*_{qv\_fin} = -V^*_a \cos\alpha^* \end{cases} \tag{29}$$

[III. PWM Control Unit 103]

Figure 9:
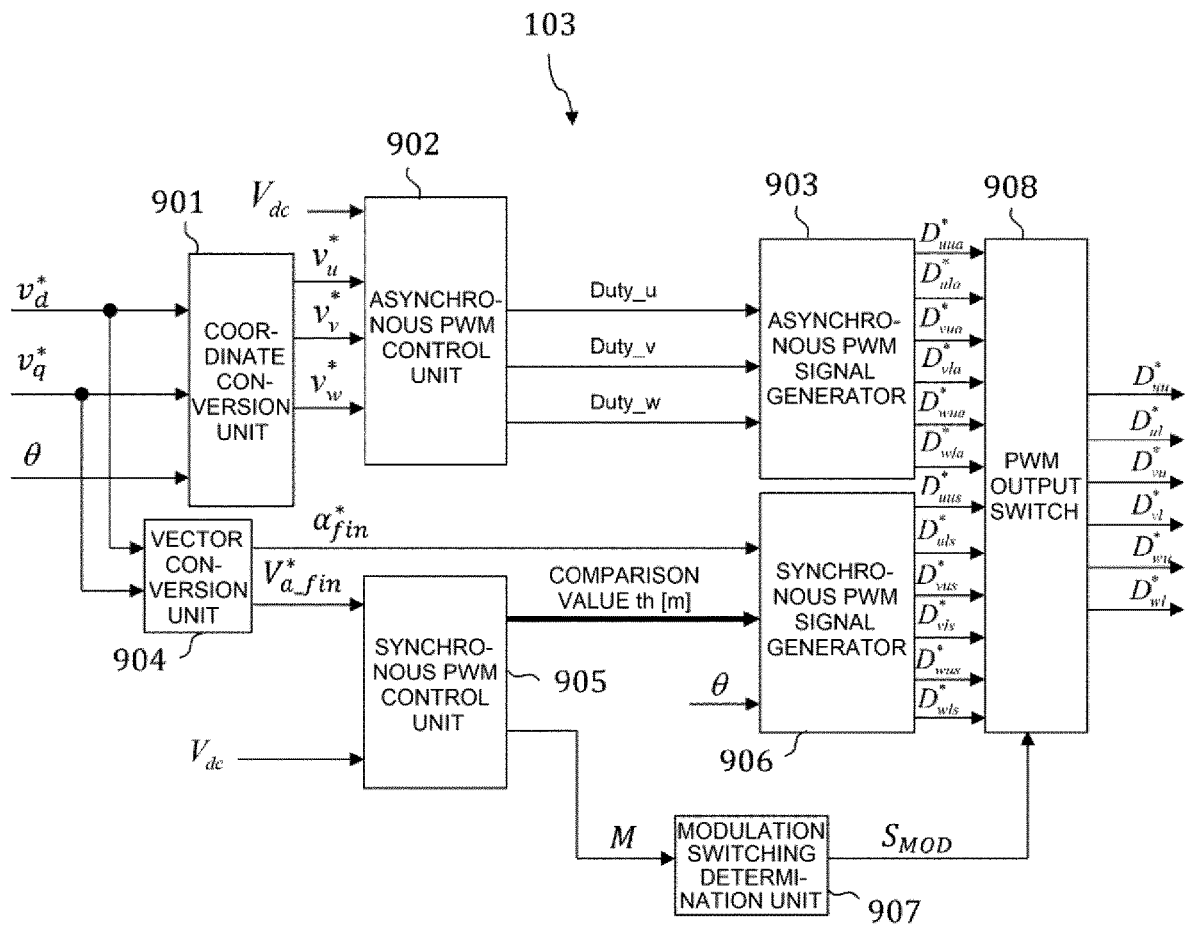
FIG. 9 is a block diagram illustrating a configuration of a PWM control unit.

FIG. 9 is a block diagram illustrating a configuration of the PWM control unit 103. As illustrated, the PWM control unit 103 includes a coordinate conversion unit 901, an asynchronous PWM control unit 902, an asynchronous PWM signal generator 903, a vector conversion unit 904, a synchronous PWM control unit 905, a synchronous PWM signal generator 906, a modulation switching determination unit 907, and a PWM output switch 908.

The coordinate conversion unit 901 uses the electric angle θ to perform coordinate conversion based on the following Equation (30) on the dq-axis voltage command value $v^*_x$ input from the torque control unit 102 to acquire a three-phase voltage command value ($v^*_u$, $V^*_v$, $V^*_w$).

[Math. 16]

$$\begin{bmatrix} v^*_u \\ v^*_v \\ v^*_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v^*_d \\ v^*_q \end{bmatrix} \tag{30}$$

The asynchronous PWM control unit 902 receives the DC voltage $V_{dc}$ and the three-phase voltage command value ($v^*_u$, $v^*_v$, $v^*_w$), and then acquires duty command values (Duty_u, Duty_v, Duty_w) based on the following Equation (31).

[Math. 17]

$$\text{Duty}_{\_u} = 50\left(1 + \frac{2v^*_u}{V_{dc}}\right) \tag{31}$$

$$\text{Duty}_{\_v} = 50\left(1 + \frac{2v^*_v}{V_{dc}}\right) [\%]$$

$$\text{Duty}_{\_w} = 50\left(1 + \frac{2v^*_w}{V_{dc}}\right)$$

The asynchronous PWM signal generator 903 receives the duty command values (Duty_u, Duty_v, Duty_w) and then generates asynchronous driving signals $D^*_{uua}$ to $D^*_{wla}$ to drive each of the six elements (an upper arm element and a lower arm element of each of the three phases) of the inverter 104. More specifically, the asynchronous PWM signal generator 903 generates the asynchronous driving signals $D^*_{uua}$ to $D^*_{wla}$ by compare match between a carrier triangular wave of a predetermined frequency (a carrier signal $C_a$) and the duty command value for each phase (Duty_u, Duty_v, Duty_w). Note that the first subscripts "u", "v", and "w" of the asynchronous driving signals $D^*_{uua}$ to $D^*_{wla}$ represent each phase of UVW. The second subscripts "u" and "l" represent the upper arm element ("u") or the lower arm element ("l") of the inverter 104. The third subscript "a" represents an asynchronous PWM signal.

Meanwhile, the vector conversion unit 904 receives the dq-axis voltage command value $v^*_x$ and then calculates a final voltage norm command value $V^*_{a\text{-}fin}$ and a final voltage phase command value d'fin based on the following Equation (32).

[Math. 18]

$$\begin{cases} V^*_{a\_fin} = \sqrt{v^{*2}_d + v^{*2}_q} \\ \alpha^*_{fin} = \tan^{-1}\frac{-v^*_d}{v^*_q} \end{cases} \tag{32}$$

The synchronous PWM control unit 905 receives the final voltage norm command value $V^*_{a\text{-}fin}$ and the DC voltage $V_{dc}$, and then determines a comparison value Th [m] (m=1, 2, 3, ...) to be compared with a carrier signal $C_s$ used in synchronous PWM control.

Figure 10:
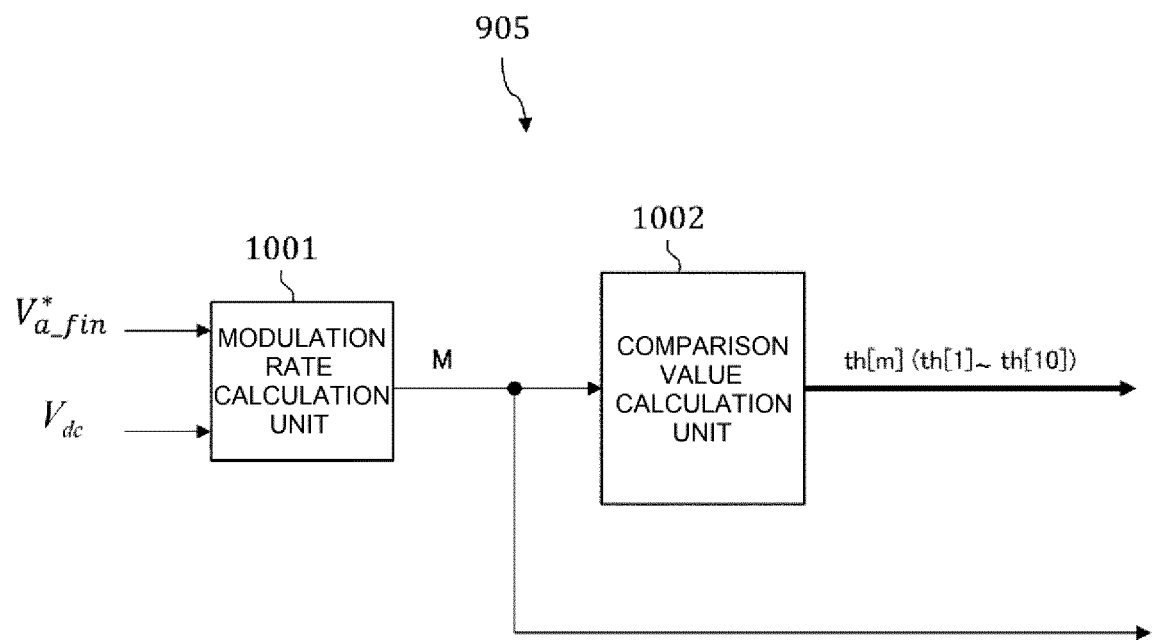
FIG. 10 is a block diagram illustrating a configuration of a synchronous PWM control unit.

FIG. 10 is a block diagram illustrating a configuration of the synchronous PWM control unit 905. As illustrated, the synchronous PWM control unit 905 includes a modulation rate calculation unit 1001 and a comparison value calculation unit 1002.

The modulation rate calculation unit 1001 acquires the modulation rate M based on the following Equation (33) from the final voltage norm command value $V^*_{a\text{-}fin}$ and the DC voltage $V_{dc}$.

[Math. 19]

$$M = \frac{\sqrt{2}\, V^*_{a\_fin}}{V_{dc}} \tag{33}$$

The comparison value calculation unit 1002 receives the modulation rate M and then refers to a comparison value table prepared in advance to acquire a plurality of comparison values Th [m]. Note that an ON/OFF phase of a synchronous PWM pulse acquired in advance by numerical calculation based on an experimental or predetermined analysis method so as to suppress a harmonic current for each modulation rate M is stored as the comparison value Th [m] in the comparison value table. Examples of the predetermined analysis method include selected harmonic elimination (SHE), which eliminates harmonics of a specific order by adjusting the number of switching cycles. Especially, in the present embodiment, ten comparison values Th [1], Th [2], . . . . Th are stored in the comparison value table. Note that the number of comparison values Th [n] can be adjusted as appropriate depending on, for example, the number of pulses per cycle of the desired electric angle θ.

Returning to FIG. 9, the synchronous PWM signal generator 906 receives the final voltage phase command value α*$_{fin}$, the comparison value Th [m], and the electric angle θ, and then generates synchronous driving signals D*$_{uus}$ to D*$_{wls}$. Especially, the synchronous PWM signal generator 906 generates the synchronous driving signals D*$_{uus}$ to D*$_{wls}$ by compare match between the carrier signal C$_s$ generated by combining the electric angle θ and the final voltage phase command value d'fin and the comparison value Th [m]. Note that the first subscripts "u", "v", and "w" of the synchronous driving signals D'uus to D'wls represent each phase of UVW. The second subscripts "u" and "l" represent the upper arm element ("u") or the lower arm element ("l") of the inverter 104. The third subscript "s" represents a synchronous PWM signal.

For example, the synchronous PWM signal generator 906 generates carrier signals C$_{us}$, C$_{vs}$, and C$_{ws}$ of each phase of UVW based on the following Equation (34).

[Math. 20]

$$\begin{cases} C_{us} = \theta + a^*_{fin} \\ C_{vs} = \theta + a^*_{fin} - \frac{2}{3}\pi \\ C_{ws} = \theta + a^*_{fin} + \frac{2}{3}\pi \end{cases} \quad (34)$$

Figure 11:
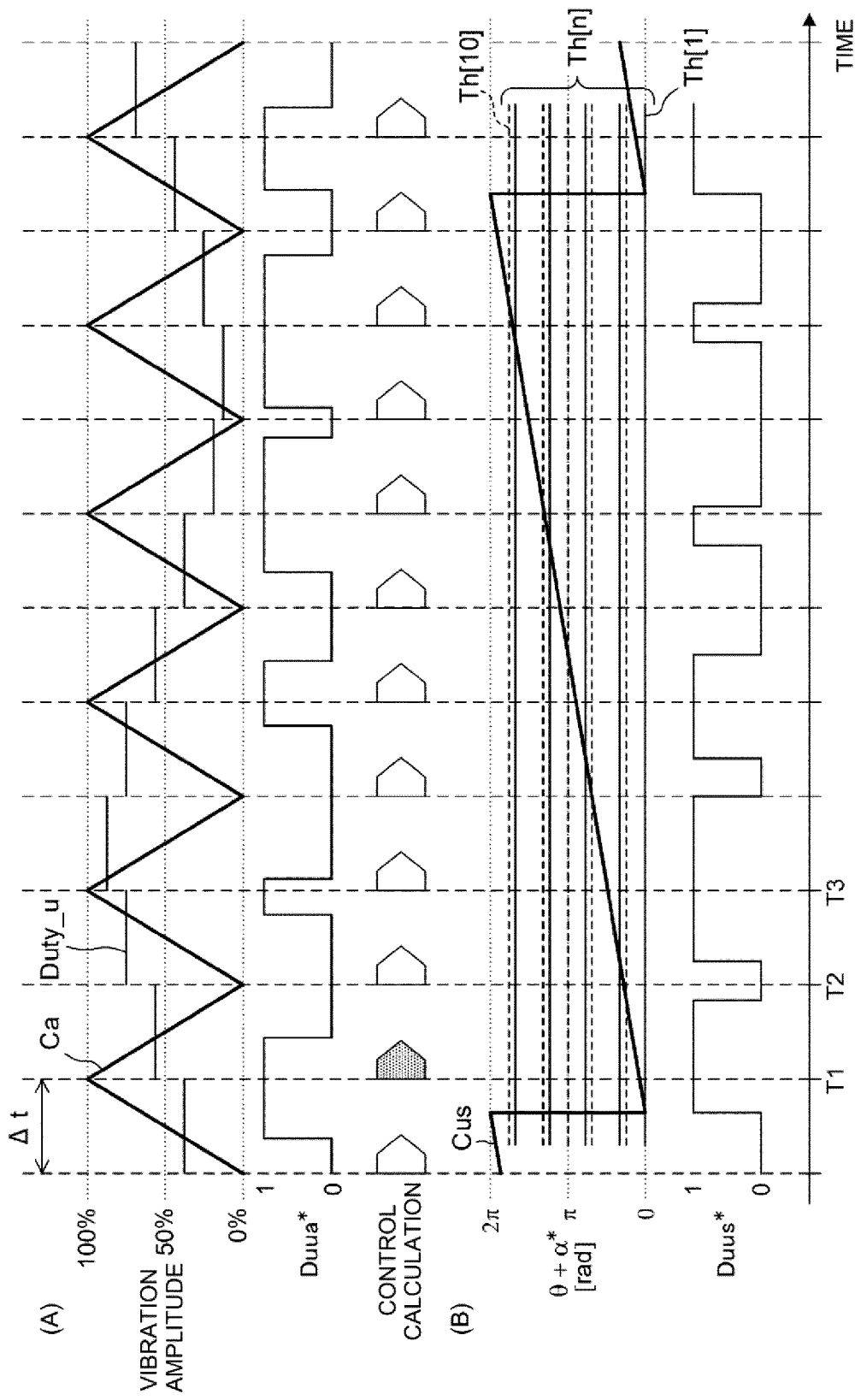
FIG. 11 is a timing chart illustrating processing in asynchronous PWM control and synchronous PWM control.

FIG. 11 is a timing chart illustrating outlines of operations in the asynchronous PWM control and the synchronous PWM control.

In the asynchronous PWM control shown in FIG. 11(A), the frequency of the carrier signal C$_a$ can be freely set regardless of the position (electric angle θ) and driving frequency of the motor 106. Meanwhile, an arrangement interval of pulses in an asynchronous PWM signal is limited to a control period Δt. Note that in the asynchronous PWM control, interrupt of each control calculation and update of each parameter according to results of these control calculations are performed every control period Δt (every ½ period of the carrier signal C$_a$).

Meanwhile, in the synchronous PWM control shown in FIG. 11(B), the arrangement interval of pulses in a synchronous PWM signal is substantially independent of the control period Δt and can be freely adjusted substantially. Therefore, when the motor 106 is driven in an overmodulation region and a rectangular wave region where the number of pulses is limited, there is an advantage that harmonics and ripples of the current can be easily reduced. Note that in the synchronous PWM control, as in the asynchronous PWM control, interrupt of each control calculation and update of each parameter according to results of these control calculations are performed every control period Δt (every ½ period of the carrier signal C$_s$).

Returning to FIG. 9, the modulation switching determination unit 907 receives the modulation rate M, and then selects the modulation mode in which either the synchronous PWM control or the asynchronous PWM signal is performed using the same logic as that for generating the mode selection signal S$_{MO}$ described in Table 2. Then, the modulation switching determination unit 907 generates a modulation mode command signal S$_{MOD}$ for instructing execution of the selected modulation mode.

The PWM output switch 908 receives the modulation mode command signal S$_{MOD}$, and then outputs either the asynchronous driving signals D*$_{uua}$ to D*$_{wla}$ or the synchronous driving signals D*$_{uus}$ to D*$_{wls}$ to the inverter 104 as the driving signals D*$_{uu}$ to D*$_{w1}$ for the switching elements.

Figure 12:
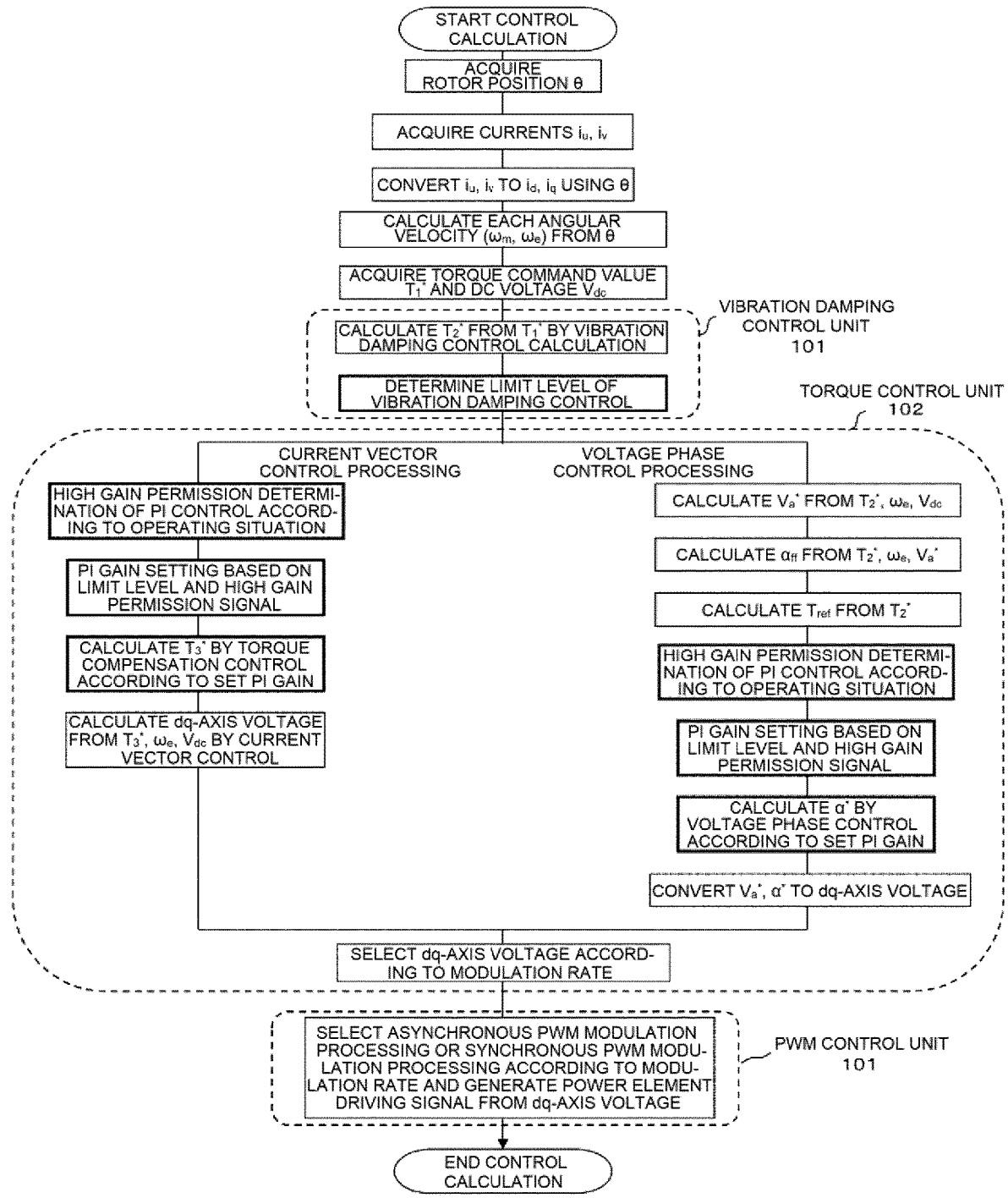
FIG. 12 is a flowchart illustrating each processing in the vibration damping control unit, the torque control unit, and the PWM control unit.

Note that FIG. 12 shows a flowchart of each processing in the vibration damping control unit 101, the torque control unit 102, and the PWM control unit 103 described above.

The electric motor control method of the present embodiment described above and functions and effects thereof will be described.

The present embodiment provides an electric motor control method for controlling an electric motor (motor 106) based on the first torque command value T*$_1$ corresponding to the required output of the motor 106.

This electric motor control method includes a vibration damping step (the mechanical angular velocity estimating unit 203, the vibration torque estimating unit 204, and the gain unit 205 in particular) of calculating the second torque command value T*$_2$ by correcting the first torque command value T*$_1$ by the vibration compensation torque T$_{fb}$; a limiting step (the absolute value processing unit 201 and the limiter 202 in particular) of limiting the vibration compensation torque T$_{fb}$ based on a limit request suggesting amount (first torque command value T*$_1$); a limit level determination step (the limit level determination unit 206 in particular) of determining a limit level (limit level signal S$_{H/L}$) representing a degree of limit on the vibration compensation torque T$_{fb}$; and a torque control step (the torque compensator 601 or the voltage phase control unit 502 in particular) of calculating the voltage command value v*$_x$ by feeding back the torque suggesting amount (estimated torque value T$_{est}$) suggesting an electric motor torque to the second torque command value T*$_2$.

Especially, the vibration compensation torque T$_{fb}$ is a torque correction value that suppresses vibration in the electric motor rotation speed (vibration caused by torsional vibration of the driving power transmission system). The limit request suggesting amount is a parameter that suggests a situation in which suppression of vibration in the electric motor rotation speed is to be limited (such as a situation in which abnormal noise of gears may occur or a situation in which protection of the system is to be prioritized). Further, the voltage command value v*$_x$ is a command value of the voltage supplied from a predetermined power source (battery 113) to the motor 106.

Then in the torque control step, a feedback gain (the gain k$_1$ or the gain k$_2$) of the torque suggesting amount is determined with reference to the limit level signal S$_{H/L}$ (the high gain permission determination unit 703 and the gain setting unit 704 in FIG. 7, or the high gain permission determination unit 806 and the gain setting unit 807 in FIG. 8).

As a result, in the vibration damping control that suppresses the torsional vibration of the driving power transmission system, the feedback gain of the torque suggesting amount correlated with the electric motor torque is adjusted as appropriate according to the degree of limit on the vibration suppressing function. Therefore, for example, it is possible to identify scenes in which the vibration suppression function is to be limited, such as situations in which abnormal noise due to gear backlash is to be suppressed, and then to increase the feedback gain. Therefore, even under a situation in which the suppressing function for torsional vibration of the driving power transmission system is limited, torque fluctuation can be reduced and torsional vibration of the driving power transmission system can be suppressed.

In the torque control step (the high gain permission determination unit 806 and the gain setting unit 807 in particular), the feedback gain (the gain $k_1$ or the gain $k_2$) is further determined with reference to the operating point suggesting amount that suggests the operating point of the motor 106. Especially, the operating point suggesting amount includes at least one of the electric motor rotation speed (the mechanical angular velocity $\omega_m$ or the electric angular velocity $\omega_e$) and the electric motor torque (the second torque command value $T^*_2$) (see Tables 3 and 4).

As a result, it is possible to determine the feedback gain that takes control stability into consideration according to the operating point of the motor 106. Especially, the feedback gain can be determined so as to ensure control stability while exerting the effect of suppressing the torsional vibration.

For the operating point suggesting amount, a feedback gain (the gain $k_2$ in particular) is determined with reference to the modulation rate M (Equation (33)) determined as a ratio of the voltage command value $v^*_x$ (the final voltage norm command value $V^*_{a-fin}$ in particular) to the voltage (DC voltage $V_{dc}$) of the power source.

As a result, the gain $k_2$ can be set in consideration of whether the operating point of the motor 106 belongs to a region (overmodulation region) where torque fluctuation is likely to occur due to the voltage command value $v^*_x$ being large with respect to the DC voltage Vac. Therefore, even in an electric motor control system based on the use of the overmodulation region, the feedback gain can be determined so as to ensure control stability while exerting the effect of suppressing torsional vibration.

Further, in the torque control step, the feedback gain (the gain $k_1$ or the gain $k_2$) is determined with reference to the DC voltage Vac.

As a result, an appropriate feedback gain can be determined in consideration of the state of the DC voltage $V_{dc}$ (whether it is within the system warranty or the like), in addition to the operating point of the motor 106.

Further, the electric motor control method further includes a power conversion step (PWM control unit 103) that executes PWM control for converting the DC voltage $V_{dc}$ so as to satisfy the voltage command value $v^*_x$. In this power conversion step (the modulation switching determination unit 907 in particular), a modulation method (asynchronous PWM control or synchronous PWM control) in PWM control is selected according to the operating point (modulation rate M) of the motor 106. Then, in the torque control step, the feedback gain (the gain $k_2$ in particular) is determined according to the selected modulation method (see Tables 2 and 3).

As a result, the gain $k_2$ can be set in consideration of the transition between multi-pulse driving in which PWM pulse waveform changes are particularly large in the overmodulation region and rectangular wave driving. Therefore, in the electric motor control system based on the use of the overmodulation region, A more specific control logic for determining a feedback gain that can both suppress torsional vibration and ensure control stability is achieved.

Further, in the vibration damping step (the gain unit 205 in particular) of the present embodiment, the vibration compensation torque $T_{fb}$ is calculated by applying the predetermined vibration damping gain $K_{fb}$ to the electric motor rotation speed (the mechanical angular velocity $\omega_m$ in particular). In the limiting step (the limiter 202 in particular), the vibration compensation torque $T_{fb}$ is limited by adjusting the upper and lower limit values of the vibration damping gain $K_{fb}$ according to the first torque command value $T^*_1$ as the limit request suggesting amount. Then, in the limit level determination step (the limit level determination unit 206 in particular), the limit level (limit level signal $S_{H/L}$) is determined based on the first torque command value $T^*_1$ that gives the adjusted upper and lower limit values (see Table 1).

As a result, a more specific control logic that enables detection of a scene in which the torsional vibration suppression effect may be insufficient and determination of an appropriate feedback gain for the scene is achieved.

Further, in the torque control step (the voltage phase command value calculation unit 809 in FIG. 8 in particular) of the present embodiment, the voltage phase command value $\alpha^*$ is calculated by feeding back an estimated value or a detected value (estimated torque value $T_{est}$) of the electric motor torque as the torque suggesting amount, and the voltage command value $v^*_x$ (the dq-axis voltage command value $v^*_{xv-fin}$) is calculated based on the voltage phase command value $\alpha^*$.

As a result, in voltage phase control, where it is generally difficult to achieve both control stability and highly responsive feedback gain setting as compared with the current vector control, the feedback gain (the gain $k_2$ in particular) can be determined according to the limit level signal $S_{H/L}$ so as to satisfy both requirements above. More specifically, when the limit level signal $S_{H/L}$ is Low, the gain $k_2$ is made low (low gain), while when the limit level signal $S_{H/L}$ is High, the gain $k_2$ is made high (high gain) within a range that does not impair control stability, so that it is possible to both suppress torsional vibration and ensure control stability.

In the torque control step of the present embodiment (the torque compensator 601 in FIG. 7 in particular), the estimated value or detected value of the electric motor torque (estimated torque value $T_{est}$) is fed back as the torque suggesting amount to correct the second torque command value $T^*_2$, and the voltage command value v'x (the dq-axis voltage command value $v^*_{xi-fin}$ in particular) is calculated based on the corrected second torque command value $T^*_2$ (the third torque command value $T_3^*$).

As a result, even in a control method such as the current vector control that does not have a structure that directly feeds back the estimated torque value $T_{est}$ in calculating the voltage command value $v^*_x$, the feedback gain (the gain $k_1$) can be determined according to the limit level signal $S_{H/L}$ so as to both suppress torsional vibration and ensure control stability. More specifically, when the limit level signal $S_{H/L}$ is Low, the gain $k_1$ is made low, while when the limit level signal $S_{H/L}$ is High, the gain $k_1$ is made high within a range that does not impair control stability, so that it is possible to both suppress torsional vibration and ensure control stability.

In the present embodiment, the electric motor control device 10 suitable for executing the above-mentioned electric motor control method is provided.

Especially, the electric motor control device 10 includes a vibration damping unit (the mechanical angular velocity estimating unit 203, the vibration torque estimating unit 204, and the gain unit 205 in particular) that calculates the second torque command value $T^*_2$ by correcting the first torque command value $T^*_1$ by the vibration compensation torque $T_{fb}$; a limiting unit (the absolute value processing unit 201 and the limiter 202 in particular) that limits the vibration compensation torque $T_{fb}$ based on a limit request suggesting amount (first torque command value $T^*_1$); a limit level determination unit 206 that determines a limit level (limit level signal $S_{H/L}$) representing a degree of limit on the vibration compensation torque $T_{fb}$; and a torque control unit (the torque compensator 601 or the voltage phase control unit 502 in particular) that calculates the voltage command value v*$_x$ by feeding back the torque suggesting amount (estimated torque value T$_{est}$) suggesting an electric motor torque to the second torque command value T*$_2$.

Then, the torque control unit 102 determines a feedback gain (the gain k$_1$ or the gain k$_2$) of the torque suggesting amount with reference to the limit level signal S$_{H/L}$ (the high gain permission determination unit 703 and the gain setting unit 704 in FIG. 7, or the high gain permission determination unit 806 and the gain setting unit 807 in FIG. 8).

Second Embodiment

The second embodiment will be described below. Note that the same elements as those in the first embodiment are denoted by the same reference numerals, and the description thereof will be omitted. Especially, the electric motor control method of the present embodiment is implemented by a vibration damping control unit 101 that is different from that of the first embodiment.

Figure 13:
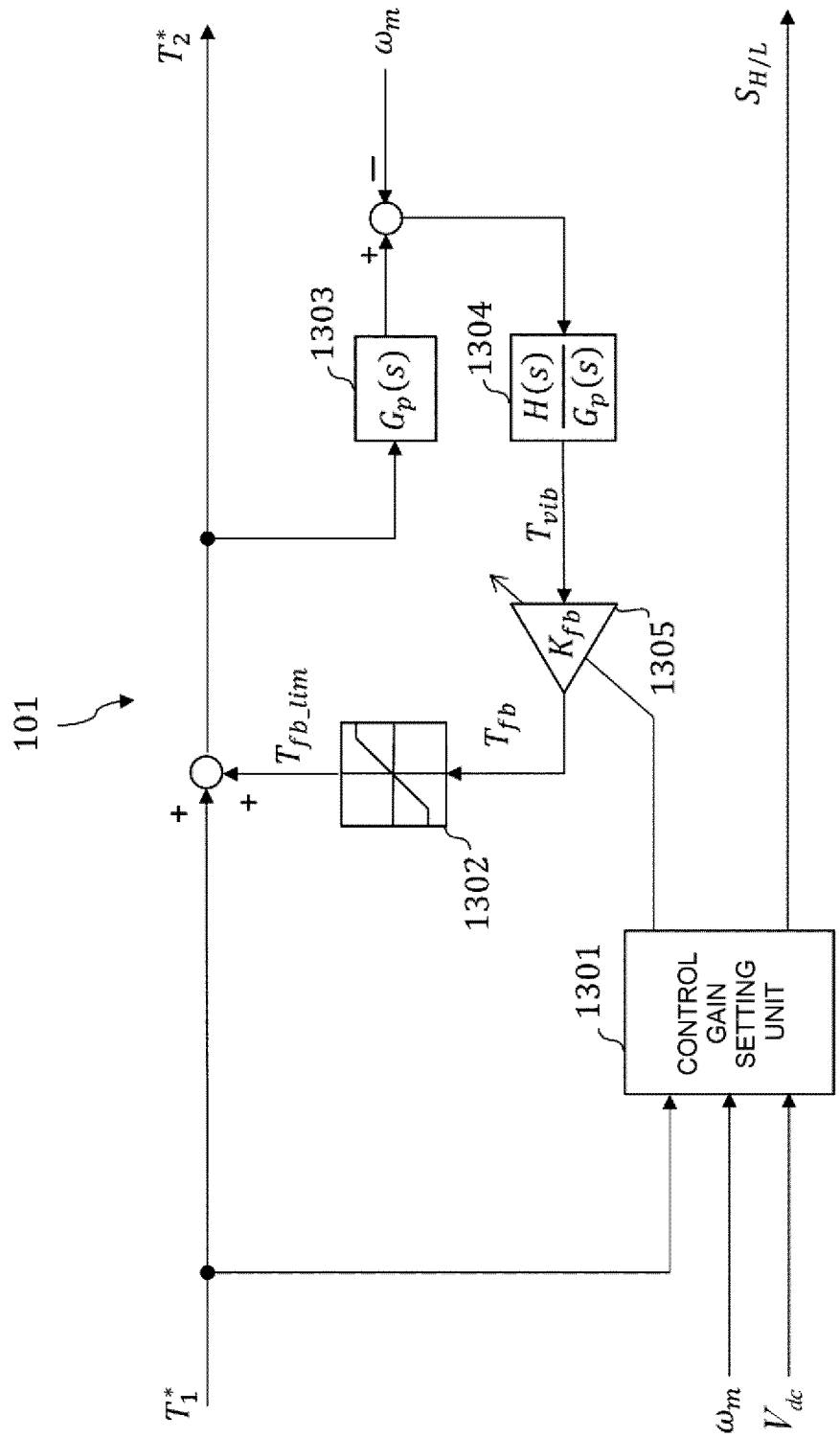
FIG. 13 is a block diagram illustrating a configuration of the vibration damping control unit according to another embodiment.

FIG. 13 is a block diagram illustrating a configuration of the vibration damping control unit 101 according to the present embodiment. The vibration damping control unit 101 of the present embodiment includes a mechanical angular velocity estimating unit 1303, a vibration torque estimating unit 1304, and a gain unit 1305 as a configuration for calculating the vibration compensation torque T$_{fb}$. Note that these functions are the same as those of the mechanical angular velocity estimating unit 203, vibration torque estimating unit 204, and gain unit 205 in the first embodiment.

The vibration damping control unit 101 includes a limiter 1302 as a configuration for determining the limited vibration compensation torque T$_{fb\_lim}$ from the vibration compensation torque T$_{fb}$. Further, the vibration damping control unit 101 includes a control gain setting unit 1301 as a configuration for generating the limit level signal S$_{H/L}$.

Functions of the mechanical angular velocity estimating unit 1303 and the vibration torque estimating unit 1304 are the same as those of the mechanical angular velocity estimating unit 203 and the vibration torque estimating unit 204 in the first embodiment, respectively. Meanwhile, the gain unit 1305 of the present embodiment generates the vibration damping gain K$_{fb}$ that is a variable value according to a command from the control gain setting unit 1301.

The limiter 1302 performs limit processing on the vibration damping gain K$_{fb}$ based on predetermined upper limit value and lower limit value to obtain the limited vibration compensation torque T$_{fb\_lim}$. Especially, in the present embodiment, fixed values that are appropriately determined from the viewpoint of suppressing overflow in control and the like are used as the upper limit value and lower limit value used for the limit processing.

The control gain setting unit 1301 receives the first torque command value T*$_1$, the mechanical angular velocity Om, and the DC voltage V$_{dc}$, and then adjusts the vibration damping gain Km (sets the upper and lower limit values in the limiter 1302) and generates the limit level signal S$_{H/L}$. Especially, when the first torque command value T*$_1$ is within a predetermined range from the viewpoint of suppressing control instability due to gear backlash, the control gain setting unit 1301 corrects the vibration damping gain Km so that it becomes smaller than the basic value. In a scene in which a possible output torque of the motor 106 decreases due to the mechanical angular velocity ω$_m$ exceeding a predetermined range, the control gain setting unit 1301 corrects the vibration damping gain K$_{fb}$ so that it becomes smaller than the basic value. Note that the control gain setting unit 1301 sets the limit level signal S$_{H/L}$ to High when making the vibration damping gain K$_{fb}$ smaller than the basic value based on the first torque command value T*$_1$ and/or the mechanical angular velocity ω$_m$. As a result, the gain k$_1$ used in the torque compensator 601 of the current vector control unit 501 and the gain k$_2$ used in the voltage phase control unit 502 are set to high values, and therefore torsional vibration of the driving power transmission system is suitably suppressed.

On the other hand, when the DC voltage V$_{dc}$ is less than a predetermined system lower limit voltage, the control gain setting unit 1301 makes the vibration damping gain K$_{fb}$ smaller than the basic value while setting the limit level signal S$_{H/L}$ to Low. Note that the system lower limit voltage is a threshold value of the DC voltage V$_{dc}$ from the viewpoint of determining whether an abnormality in an electric power system such as a power source abnormality occurs. In this way, by reducing the vibration damping gain Km when the DC voltage V$_{dc}$ is less than the system lower limit voltage, it is possible to suppress a decrease in control stability due to abnormalities in the electric power system. Meanwhile, by setting the limit level signal S$_{H/L}$ to Low, a state in which the vibration compensation torque T$_{fb}$ is unnecessarily limited is suppressed.

That is, in the present embodiment, the first torque command value T*$_1$ and the mechanical angular velocity ω$_m$ function as a limit request suggesting amount that suggests a situation in which suppression of torsional vibration in the driving power transmission system is to be limited (particularly a situation in which abnormal noise due to gear backlash may occur). The DC voltage V$_{dc}$ functions as a limit request suggesting amount that suggests a situation in which suppression of torsional vibration of the driving power transmission system is to be limited (particularly a situation in which system protection is to be prioritized).

The control gain setting unit 1301 adjusts the vibration damping gain K$_{fb}$ and sets the limit level signal S$_{H/L}$ using a logic shown in Table 5, for example.

TABLE 5

| Torque T$_1$* [Nm] | Mechanical angular velocity ω$_m$ [rad/s] | DC voltage V$_{dc}$ [V] | Vibration damping gain K$_{fb}$ | Limit level signal |
| --- | --- | --- | --- | --- |
| −30 < T$_1$* < 30 | — | — | 0 | High |
| Other than above | \|ω$_m$\| > 1000 | — | 0.2 | |
| | Other than above | < System lower limit voltage | 0 | Low |
| | | Other than above | 0.9 | |

The electric motor control method of the present embodiment described above and functions and effects thereof will be described.

In the vibration damping step of the present embodiment, the vibration compensation torque T$_{fb}$ is calculated by applying the predetermined vibration damping gain Ko to the electric motor rotation speed (the mechanical angular velocity ω$_m$ in particular). In the limiting step (the control gain setting unit 1301 in particular), the vibration compensation torque T$_{fb}$ is limited by adjusting the vibration damping gain K$_{fb}$ according to at least one of the mechanical angular velocity ω$_m$, the first torque command value T*$_1$, and the DC voltage V$_{dc}$ as the limit request suggesting amount. Then, in the limit level determination step (the control gain setting unit 1301 in particular), the limit level signal $S_{H/L}$ is determined based on at least one of the mechanical angular velocity $\omega_m$, the first torque command value $T^*_1$, and the DC voltage $V_{dc}$ that gives the adjusted vibration damping gain Km.

As a result, a more specific control logic that enables detection of a scene in which the torsional vibration suppression effect may be insufficient and determination of an appropriate feedback gain for the scene is achieved.

Note that instead of the control logic that limits the vibration compensation torque $T_{fb}$ by adjusting the vibration damping gain $K_{fb}$, a control logic may be adopted in which the upper and lower limit values of the vibration compensation torque $T_{fb}$ themselves are limited with respect to a predetermined basic value.

Although the embodiment of the present invention has been described above, the above embodiments are merely a part of application examples of the present invention, and do not mean that the technical scope of the present invention is limited to the specific configurations of the above embodiments.

The specific numerical values shown in each table are merely examples, and the technical scope of the present invention is not limited to the specific numerical values. Regarding the limit request suggesting amount, it is not limited to the modes described in the above embodiments, and as long as it serves the function of suggesting a situation in which the suppression of torsional vibration in the driving power transmission system is to be limited, any parameter indicating the operating state of the motor 106, the state of the control system including the motor 106, and/or the traveling state of the vehicle equipped with the motor 106 can be adopted. Further, the operating point suggesting amount is not limited to the modes described in the above embodiments, and any parameter that can define the operating point of the motor 106 can be adopted.

The invention claimed is:

1. An electric motor control method for controlling an electric motor based on a first torque command value corresponding to a required output of the electric motor, the electric motor control method comprising:
    a vibration damping step of calculating a second torque command value by correcting the first torque command value by a vibration compensation torque, the vibration compensation torque being a torque correction value for suppressing vibration in an electric motor rotation speed;
    a limiting step of limiting the vibration compensation torque based on a limit request suggesting amount, the limit request suggesting amount being a parameter suggesting a situation in which suppression of vibration in the electric motor rotation speed is to be limited;
    a limit level determination step of determining a limit level representing a degree of limit on the vibration compensation torque; and
    a torque control step of calculating a voltage command value by feeding back a torque suggesting amount suggesting an electric motor torque to the second torque command value, the voltage command value being a command value of a voltage supplied from a predetermined power source to the electric motor, wherein
    in the torque control step, a feedback gain of the torque suggesting amount is determined with reference to the limit level.

2. The electric motor control method according to claim 1, wherein
    in the torque control step, the feedback gain is further determined with reference to an operating point suggesting amount suggesting an operating point of the electric motor.

3. The electric motor control method according to claim 2, wherein
    the operating point suggesting amount includes at least one of the electric motor rotation speed and the electric motor torque.

4. The electric motor control method according to claim 2, wherein
    the operating point suggesting amount includes a modulation rate determined as a ratio of the voltage command value to the voltage of the power source.

5. The electric motor control method according to claim 1, wherein
    in the torque control step, the feedback gain is further determined with reference to the voltage of the power source.

6. The electric motor control method according to claim 1, further comprising:
    a power conversion step of performing PWM control for converting the voltage of the power source to satisfy the voltage command value, wherein
    in the power conversion step, a modulation method in the PWM control is selected according to the operating point of the electric motor, and
    in the torque control step, the feedback gain is further determined according to the selected modulation method.

7. The electric motor control method according to claim 1, wherein
    in the vibration damping step, the vibration compensation torque is calculated by applying a predetermined vibration damping gain to the electric motor rotation speed,
    in the limiting step, the vibration compensation torque is limited by adjusting the vibration damping gain or upper and lower limit values of the vibration damping gain according to the limit request suggesting amount, and
    in the limit level determination step, the limit level is determined based on the limit request suggesting amount that gives the adjusted vibration damping gain or upper and lower limit values of the vibration damping gain.

8. The electric motor control method according to claim 7, wherein
    in the limiting step, the vibration compensation torque is limited by adjusting the upper and lower limit values of the vibration damping gain or upper and lower limit values of the vibration compensation torque according to at least one of the electric motor rotation speed, the electric motor torque, and the voltage of the power source as the limit request suggesting amount, and
    in the limit level determination step, the limit level is determined based on at least one of the electric motor rotation speed, the electric motor torque, and the voltage of the power source that gives the adjusted upper and lower limit values of the vibration damping gain or upper and lower limit values of the vibration compensation torque.

9. The electric motor control method according to claim 1, wherein
in the torque control step, a voltage phase command value is further calculated by feeding back an estimated value or a detected value of the electric motor torque as the torque suggesting amount, and
the voltage command value is calculated based on the voltage phase command value.

10. The electric motor control method according to claim 1, wherein
in the torque control step, the second torque command value is further corrected by feeding back an estimated value or a detected value of the electric motor torque as the torque suggesting amount, and
the voltage command value is calculated based on the corrected second torque command value.

11. An electric motor control device that controls an electric motor based on a first torque command value corresponding to a required output of the electric motor, the electric motor control device comprising:
a vibration damping unit that calculates a second torque command value by correcting the first torque command value by a vibration compensation torque, the vibration compensation torque being a torque correction value for suppressing vibration in an electric motor rotation speed;
a limiting unit that limits the vibration compensation torque based on a limit request suggesting amount, the limit request suggesting amount being a parameter suggesting a situation in which suppression of vibration in the electric motor rotation speed is to be limited;
a limit level determination unit that determines a limit level representing a degree of limit on the vibration compensation torque; and
a torque control unit that calculates a voltage command value by feeding back a torque suggesting amount suggesting an electric motor torque to the second torque command value, the voltage command value being a command value of a voltage supplied from a predetermined power source to the electric motor, wherein
the torque control unit determines a feedback gain of the torque suggesting amount with reference to the limit level.

* * * * *